Aug. 25, 1970   R. D. KOHLER   3,525,991
CONVERTER

Filed June 15, 1966   9 Sheets-Sheet 7

Fig-7

INVENTOR.
ROBERT D. KOHLER
BY
Thomas H. Grafton
ATTORNEY

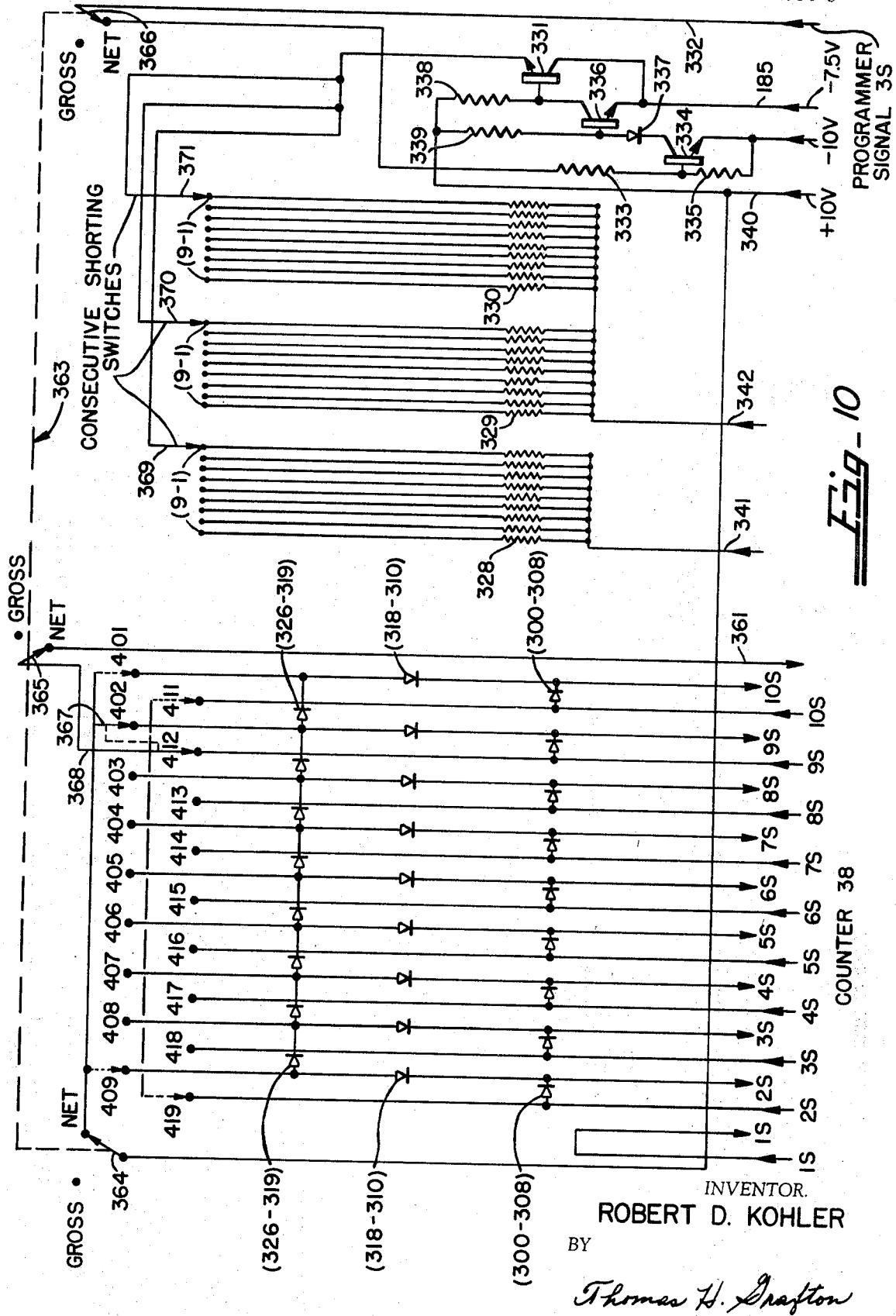

United States Patent Office 3,525,991
Patented Aug. 25, 1970

3,525,991
CONVERTER
Robert D. Kohler, Temperance, Mich. (% Toledo Scale
Corporation, P.O. Box 6757, Toledo, Ohio 43612)
Filed June 15, 1966, Ser. No. 557,708
Int. Cl. H03k 13/02, 13/14
U.S. Cl. 340—347                        18 Claims

ABSTRACT OF THE DISCLOSURE

A system for measuring an analog signal including an analog signal source having an output consisting of a direct current analog signal and an unwanted direct current signal, a power supply for energizing the source, switch means for connecting the power supply to the source, means for canceling said unwanted signal establishing a zero reference, and means responsive to the switch means for measuring the difference between the zero reference and the analog signal.

---

This invention relates to systems or converters for measuring analog signals.

The converter is particularly well suited for providing a digital indication of the weight of a load upon an electronic weighing scale in which one or more strain gage load cells provide a voltage which is proportional to the weight of such load. Other load responsive transducers can be used to provide the voltages functionally related to the weights of the loads, or voltages produced by other types of measuring devices, such as thermal and pressure responsive devices, can be measured by the converter.

The objects of this invention are to provide new techniques in measuring direct current voltages, to improve systems for measuring analog signals, and to provide a novel electronic weighing system.

One embodiment of this invention enabling the realization of these objects is an analog to digital converter which is incorporated in an electronic weighing system. The weighing system establishes a voltage corresponding to the weight of an object being weighed and this voltage is replaced by a substitute voltage in order to compensate for thermal electromotive forces and contact potentials generated in signal circuits. The bandwidth of the system is adjustable to suppress vibrations and optimize each installation.

The substitute voltage is balanced against a staircase voltage under the control of a programmer and four counters (1000, 100, 10 and 1 places in the weight value). When the substitute voltage varies from zero, the programmer causes a staircase voltage step worth 1000 to be balanced against the substitute voltage. If more 1000 place steps are needed, clock pulses into the 1000 place counter cause more 1000 place staircase voltage steps to be produced until the presence of one too many 1000 place staircase voltage steps is sensed. The first 1000 place staircase voltage step produced by the programmer then is subtracted leaving a count in the 1000 place counter equal to the thousands place in the weight of the object being weighed. The hundreds, tens and units places are measured in a similar manner, except in the case of the units place no initial false programmer step is used. In this way, a maximum of forty counts are required to enter ten thousand digits, thus reducing the time for a given clock frequency by a factor of two hundred and fifty. For example, if the staircase were generated in a conventonal manner starting with the least significant decade and generating a pulse for every count, ten thousand counts using a clock frequency of 10 kc. would require one second. Using the present method, the same ten thousand output, obtained with forty counts requires a maximum of four milliseconds.

The electronic weighing system includes tare circuitry which uses some of the 1000 place staircase voltage steps to provide tare voltage for the most significant decade.

In accordance with the above, one feature of this invention resides in the new technique of measuring the load cell voltage by the substitution method, thus compensating for thermal electromotive forces and contact potentials generated in the signal circuit. More broadly, such feature resides in turning the transducer excitation (load cell) on and off in a system which compensates for such thermal electromotive forces and contact potentials. This system includes an analog signal source having an output consisting of a direct current analog signal and an unwanted direct current signal, a power supply for energizing the source, switch means for connecting the power supply to the source, means for canceling said unwanted signal establishing a zero reference, and means responsive to the switch means for measuring the difference between the zero reference and the output signal.

Another feature resides in the adjustable bandwidth to suppress vibrations. Such adjustable bandwidth is correlated with the time interval of measurement of the analog signal in a system which includes an analog input signal source, variable filter means connected to the source for varying the bandwidth of the system, means for converting the signal to a representation during a time interval, timer means for varying the time interval, there being optimum values for said time interval and said bandwidth requiring the time interval to be lengthened when the bandwidth is narrowed and the time interval to be shortened when the bandwidth is widened, and adjustment means connecting the filter means and the timer means for conjoint movement, whereby movement of the adjustment means to select the optimum bandwidth maintains the optimum time interval or movement of the adjustment means to select the optimum time interval maintains the optimum bandwidth. Another automatically variable bandwidth adjustment in another part of the converter produces fast readouts with good resolution.

Still another feature resides in counting from the most significant place on down in the simplified method described above (maximum of forty counts to enter ten thousand digits).

A further feature resides in using a staircase generator for both net and tare weight balancing. The tare circuit includes an over-capacity interlock.

The above and other objects and features of this invention will be appreciated more fully from the following detailed description when read with reference to the accompanying drawings wherein:

FIG. 1 is a block diagram of an electronic weighing system embodying the present invention;

FIGS. 2–5 are block diagrams each showing a part of the logic circuit shown as a single block in FIG. 1, FIGS. 2 and 3 being connected together at lead ends $a$–$m$, FIGS. 3 and 4 being connected together at lead ends $a'$–$o'$, and FIGS. 4 and 5 being connected together at lead ends $''a$–$j''$;

FIG. 7 is a schematic diagram of one of the two identical staircase generators shown in FIG. 1;

FIG. 10 is a schematic diagram of the tare circuit shown in FIG. 1.

Figure 1:
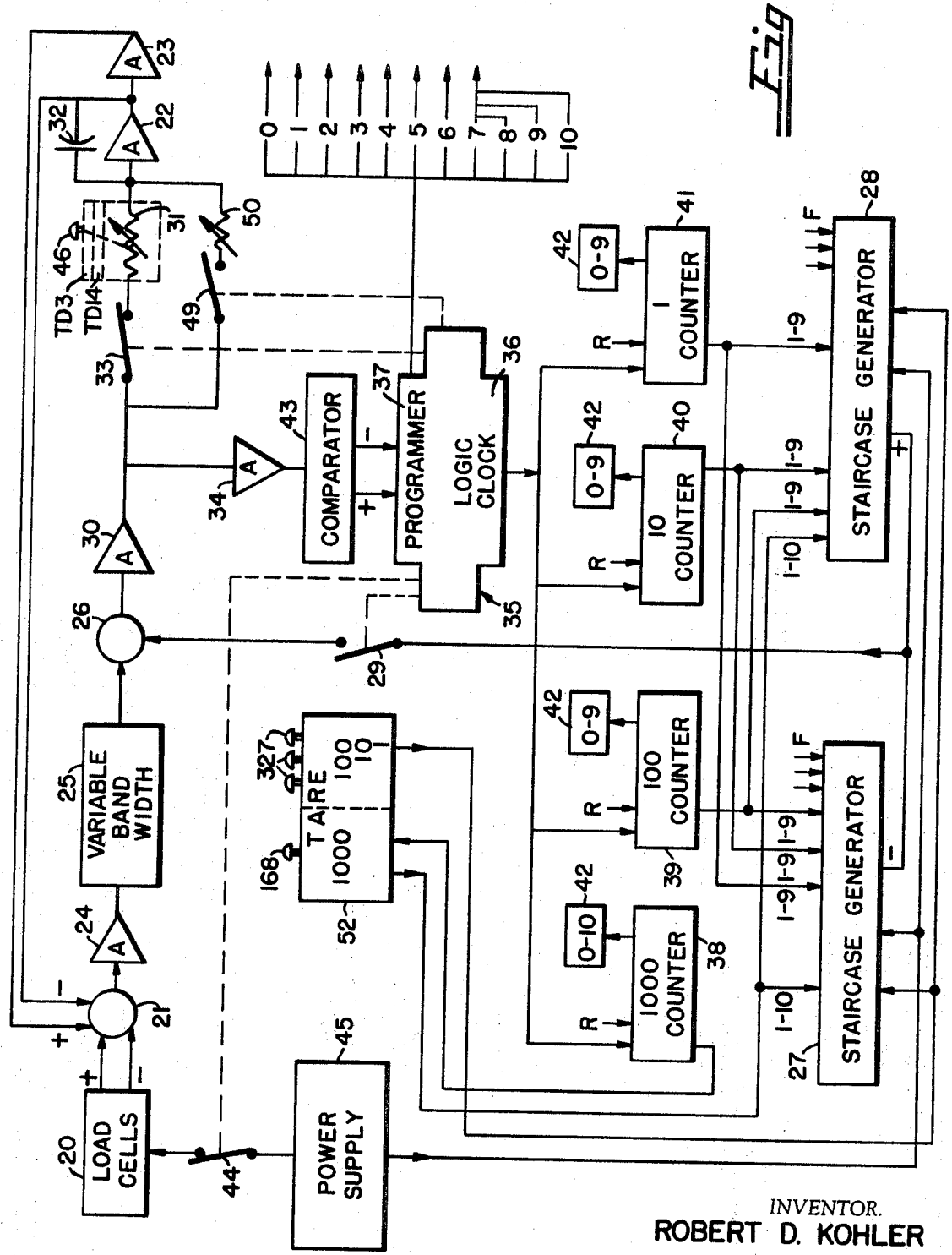

Referring to the drawings, FIG. 1 shows a weighing system having a plurality of ordinary strain gage load cells 20 which establish a direct current voltage corresponding to the weight of an object being weighed. The load cell output voltage is fed to a summing junction 21 together with feedback signals from two amplifiers 22 and 23. The signal from the summing junction 21 is amplified by another amplifier 24 and after passing through a variable bandwidth circuit 25 (shown in detail in FIG. 8) is applied to a second summing junction 26. The variable bandwidth circuit 25, described hereinafter in detail, functions to lower the noise level of the amplifier 24 during the readout cycle automatically by a ratio proportional to the square root of the reduction in bandwidth to achieve fast readouts and good resolution. A signal from one of two staircase generators 27 and 28 also is fed to the summing junction 26, when a switch 29 is closed. The signal from the summing junction 26 is amplified by an amplifier 30 and is fed to an integrating circuit composed of the amplifier 22, a variable resistor 31 and a capacitor 32 through a switch 33. The feedback signal from the amplifier 22 tends to drive the output of the amplifier 30 to zero. The output of the amplifier 30 also is fed to an amplifier 34 which raises the signal level to be compatible with logic circuitry 35 which includes a clock portion 36 and a programmer portion 37. The logic circuitry 35 controls four ring counters 38-41 which in turn, together with the programmer 37, control the staircase generators 27-28. The count in the counters is displayed by indicating devices 42. A comparator circuit 43 (shown in detail in FIG. 9), described hereinafter, is located between the amplifier 34 and the logic circuit 35.

The amplifier 22 functions in two modes. With switch 33 closed, the amplifier 22 is a conventional integrating operational amplifier, with the bandwidth determined by the values of the resistor 31 and the capacitor 32. When switch 33 is opened, the amplifier 22 becomes a hold amplifier by virtue of the capacitor 32 connected from the output to the input. Thus, it is possible to maintain a signal level at the output of the amplifier 22 simply by opening the switch 33. With switch 33 closed, the frequency response of the output of the amplifier 22 is proportional to the product of the values of the capacitor 32 and the resistor 31. By making one of these values adjustable, the frequency response or the bandwidth of the system can be varied. In a sample mode of operation, the switch 33 is closed and the switch 29 is open and a switch 44 is closed. The output of the amplifier 22 then is proportional to the load cell signal integrated with a time constant proportional to the values of the resistor 31 and the capacitor 32. This integration function tends to maintain the output about an average value if the load cell input is oscillating or changing about a given value, by attenuating the higher frequencies. By varying the resistor 31, the bandwidth of this averaging function can be varied from a fraction of a cycle per second to several hundred or even thousands of cycles per second. The load cells 20 and the staircase generators 27-28 are fed from a common power supply 45. Therefore, variations in the power supply will have similar effects on both the load cells and the staircase generators and the system remains in calibration. The amplifier 23 serves as a phase inverter to supply a voltage back to the summing junction 21 which is equal in magnitude but of opposite phase to the voltage from the amplifier 22. The amplifier 23 is required because the summing junction 21 and the amplifier 24 are differential input devices.

In the sample mode of operation (switches 33 and 44 closed and the switch 29 open), the output of the amplifier 22 follows the load cell signal with a frequency response determined by the values of the resistor 31 and the capacitor 32. When a new readout is called for, the logic circuit 35 signals switch 33 to open. The switch 33 opens and the output of the amplifier 22 holds at the average value of the load cell output at that given instant. This held signal is fed back to the summing junction 21. The switch 44 then is opened removing excitation to the load cells and their output drops to zero. The signals into the summing junction 21 no longer cancel and the signal is amplified by the amplifier 24 and is fed into the summing junction 26 and on through the amplifiers 30, 34 and into the logic circuit 35. The switch 29 is closed at this time. An unbalance at the output of the amplifier 30 causes the counters 38-41 to start and a staircase signal is fed into the summing junction 26. The staircase signal continues to increase until it is equal in magnitude but opposite in polarity to the output of the amplifier 24. At this time, the output of the summing junction 26 is zero causing the output of the amplifier 30 to be zero indicating a null to the logic circuit 35 thus stopping the counters 38-41. At the time the null between the output of the amplifier 24 and the staircase generator is indicated and the count stops, the logic circuit allows switch 44 to close thus supplying power to the load cells 20 and also closes switch 33 allowing the amplifier 22 to convert from a hold amplifier to an integrating amplifier. The system then begins integrating or averaging the load cell signal for the next readout. At the same time the switch 44 closes, the staircase generator switch 29 opens removing the staircase signal.

A significant advantage of this system resides in the fact that thermal electromotive forces and contact potentials (unwanted direct current noise) generated in the load cells 20, summing junction 21, amplifier 24, variable bandwidth circuit 25, summing junction 26 and amplifier 30 (the low level stages) are compensated. When the switches 33 and 44 are closed, a positive load cell signal and a positive load cell noise signal are applied from the load cells 20 to the summing junction 21 and a negative load cell signal and a negative load cell noise signal are applied from the amplifiers 22 and 23 to the summing junction 21. These positive and negative signals cancel each other out. An internal noise signal from the summing junction 21, amplifier 24, variable bandwidth circuit 25, summing junction 26 and amplifier 30 also is fed back to the summing junction 21 so that the output of the summing junction 21 consists solely in this internal noise signal. However, the fed back internal noise signal voltage is opposite in phase to the noise produced in components 21, 24, 25, 26 and 30. Hence, the internal noise signal is zero at the output of the amplifier 30. Accordingly, whether the switches 33 and 44 are open or closed, the internal noise signal is zero at the output of the amplifier 30. When the switches 33 and 44 are open (disregarding the internal noise signal), the removal of the power supply from the load cells 20 removes the positive load cell signal from the summing junction 21. However, the positive load cell noise signal still is applied to the summing junction 21, since it is not a function of the power supply voltage. The output of the amplifier 22 when operating in the hold mode (switch 33 open) is proportional to the load cell signal plus the load cell noise signal. These two negative signals are fed back to the summing junction 21, whereupon the positive and negative load cell noise signals cancel and only the feedback load cell signal is left in the summing junction 21. Thus, the output of the summing junction 21 represents only the desired signal which is proportional to the load cell input. It is this signal that is nulled against the staircase generator output. Alternatively, instead of closing the power supply and integrating amplifier switches 44 and 33 to feedback the load cell signal and the unwanted signal to the summing junction 21 for the purpose of establishing a zero reference and then opening the power supply switch 44 and measuring the substituted load cell signal remaining in the summing junction 21 as described above, a second mode of operation can be used. Generically the system operable in both modes can be defined as including an analog signal source having an output consisting of a direct current analog signal and an unwanted direct current signal, a power supply for energizing the source, switch means for connecting the power supply to the source, means for canceling said unwanted signal establishing a zero reference, and means responsive to the switch means for measuring the difference between the zero reference and the output signal. In the alternative or second mode of operation, the power supply switch 44 is opened and the integrating amplifier switch 33 is closed to feedback only the unwanted signal to the summing junction 21 for the purpose of establishing the zero reference (unwanted signal from load cells 20 canceled by unwanted signal feed back to summing junction 21) and then the power supply switch 44 is closed and the load cell signal is measured in exactly the same manner as described above. Since both modes use the same structure and their methods are nearly the same (mode one—close switches 33 and 44 and then open switch 44; mode two—close switch 33 and open switch 44 and then close switch 44), only the first mode of operation is described in connection with the following detailed explanation of the structure.

The amplifiers 30 and 34 act simply as null detectors; the output of each amplifier is always zero at the critical time. In the sample mode, it is zero due to the feedback from the amplifier 22 to the summing junction 21. In the readout mode (switch 33 open), the output of the amplifiers 30 and 34 is zero when the signal from the amplifier 24 representing the desired load cell signal lost by removing the power supply 45 is replaced by the identical signal from one of the staircase generators 27–28. This eases the requirements on the amplifiers 30 and 34. The amplifier 24 must be a high quality amplifier since it amplifies the difference or the loss in load cell signal. The amplifier 22 must have a high input impedance in order that it may hold the output signal for a desired length of time. In this case the readout mode or the period during which switch 33 is open is relatively short; on the order of ten milliseconds. The sample mode of operation lasts for a minimum of ninety milliseconds to a maximum determined by the operator which may be several days.

The weighing system establishes a voltage applied by the load cells 20 to the summing junction 21 corresponding to the weight of an object being weighed and this voltage is replaced by the substitute voltage from the amplifiers 22 and 23. The bandwidth of the system is adjustable by varying the resistor 31 to suppress vibrations and to optimize each installation. The substitute voltage is balanced against a positive or negative staircase voltage depending on whether or not the load cell output voltage indicates a load upon the scale which is above or below zero as sensed by the comparator 43. The staircase voltage is under the control of the programmer 37 (ring counter) and the four ring counters 38–41 (1000, 100, 10 and 1 places in the weight value). When the substitute voltage varies from zero, the programmer 37 causes a staircase voltage step work 1000 to be produced by applying a signal "F" (FIG. 1) to the staircase generators 27–28. If more 1000 place steps are needed, clock pulses from the clock 36 into the counter 38 (1000 place) cause more 1000 place staircase voltage steps to be produced until the presence of one too many 1000 place staircase voltage steps is sensed by the comparator 43. The first 1000 place staircase voltage step produced by the programmer 37 then is subtracted leaving a count in the counter 38 equal to the thousands place in the weight of the object being weighed. The hundreds, tens and units places are measured in a similar manner. The capacity of the system is 10,999 digits.

The amplifier 24 is an ordinary differential input summing amplifier. The output signals from the amplifier 24 appear with the opposite polarity as they had at the input. The amplifier 30 also is a conventional summing amplifier. The amplifier 34 is connected as a simple multiplier. The output of the amplifier 30 is fed to the amplifier 22 through the switch 33 and the variable resistor 31 which determines the bandwidth of the system. The variable resistor 31 is ganged with a front panel display time Control knob 46 and two variable timers TD3 and TD14 FIGS. 1 and 2) to maintain an optimum ratio of bandwidth to display time. If the display time setting is short meaning that readings are taken in rapid succession, the time constant of the system should be short, since the operator wishes to follow a rapidly changing signal. By the same token, if the display time control is set for a long display meaning that readouts are taken at relatively long time intervals from each other, the bandwidth is narrower since the operator is more interested in obtaining the average value of the signal. If manual or external demand signal is used, the display time control can be adjusted to provide an optimum bandwidth setting for a given installation. In either case, it is significant to note that the indication represents the output of the amplifiers 22 and 23 at the particular instant that the logic circuit 35 commanded switch 33 to open and that the output of amplifiers 22 and 23 represents the average value of the input signal as determined by the setting of the resistor 31.

Since the input amplifier 24 is differential (plus and minus signals present), it is necessary to maintain each input identical as far as impedance levels and signal levels are concerned to obtain the proper summing action. Therefore, the amplifier 23 is used which is another operational amplifier that multiplies by a fixed negative constant. The output of the amplifier 23 is fed back to the positive junction of the amplifier 24. The output of the amplifier 22 is fed back to the negative junction of the amplifier 24.

There are three modes of operation of the analog to digital converter.

The first mode of operation is a track mode in which an internally generated signal commands the converter to read out periodically at a rate determined by the setting of the display time control knob 46. The first mode is selected by turning a switch 47 (FIG. 2) to its position "2" shown in FIG. 2. In position "2" of the switch 47, the indication (indicating devices 42—FIG. 1) tracks the force applied to the load cells 20.

Figure 2:
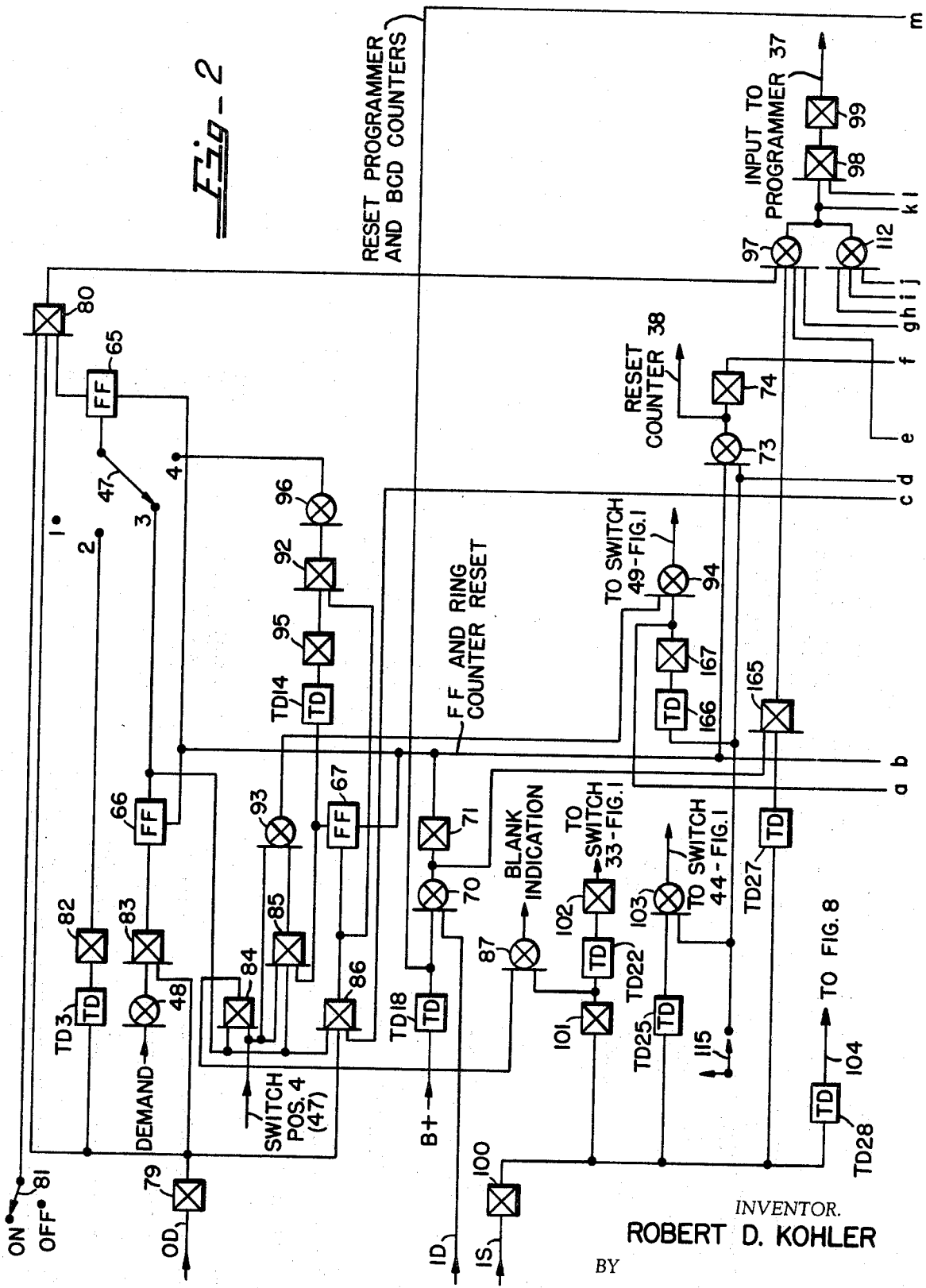

The second mode of operation is a demand mode (position "3" of the switch 47). In this mode, the indication is obtained by manual operation of contacts to place a signal on the input of a NOR gate 48 (FIG. 2). The indication is maintained until the next demand signal is entered.

The third mode of operation is a demand-null mode (position "4" of the switch 47). In this mode, a relatively narrow bandwidth (reject vibration effects) can be set by adjusting the display time control knob 46 to set the resistor 31 to a high value. In this mode, a switch 49 (FIG. 1) normally is closed and when closed it together with a variable resistor 50 bypasses the switch 33 and the resistor 31 providing a wide bandwidth (fast system response) and allowing the output of the amplifier 22 to follow the input with a minimum delay. The resistor 50 is adjusted for a particular installation and is determined by factors such as the response time of the mechanical part of the weighing scale. When a demand is entered (NOR gate 48), the switch 49 remains closed until an O.K. signal is received from the comparator 43 indicating that a null condition exists between the output of the amplifiers 22 and 23 and the sum of the load cell inputs. At this time, the logic circuit 35 opens the switch 49 and the bandwidth of the system is reduced to that determined by the setting of the resistor 31. After a predetermined time delay which allows the amplifier 22 to integrate the signal about the average level, the next O.K. signal from the comparator 43 opens the switch 33 and starts the readout cycle. This feature makes the converter useful when applied to step input type forces. To obtain a readout from a step input in minimum time while maintaining the averaging feature of the integrating amplifier 22, it is desirable to follow the step input with a minimum time lag until the output of the amplifier 22 is nearly equal to the final value of the step input. This is determined by the first null condition after the demand signal has been applied to the NOR gate 48. At this time the long time constant comes into play providing maximum averaging capability for a predetermined length of time. At the end of this time, the average level has been established and a reading is taken at the next instant that this average level coincides with the output from the load cells. The built-in time delay which controls the length of time over which the signal is averaged can be overridden by an external signal which will start the readout immediately. This feature is used in in-motion weighing, such as highway truck weighing or check-weighing.

The limitation in resolution of the converter is the noise level of the amplifier 24. Using selected transistors and proper techniques for minimizing noise, the noise level at a bandwidth of approximately one thousand cycles per second is on the order of 5 to 10 microvolts peak to peak. The desired resolution is one microvolt of load cell signal. Therefore some means of either eliminating this noise or averaging it is required. A digital filter is used in the logic circuit 35 to average the noise level and the variable bandwidth circuit 25 lowers the noise level by a ratio proportional to the square root of the reduction in bandwidth. The digital filter and the variable bandwidth circuit 25 are described hereinafter. The output of the amplifier 34 drives the comparator 43 which also is described in detail hereinafter. The comparator 43 provides two outputs which are identified as + and − in FIGS. 1, 3 and 9. The plus output of the comparator 43 is energized when the output of the amplifier 34 is plus and the negative output of the comparator 43 is energized when the output of the amplifier 34 is negative. When the input to the amplifier 34 is zero within a narrow band equivalent to one graduation at the output of the load cells 20, no signal is derived from either output of the comparator 43. This absence of signal is converted to an O.K. signal in the logic circuit 35.

The logic circuit 35 (FIGS. 2–5) is of conventional resistor transistor configuration, Although the various logic circuits mentioned herein are in common use in the electronic control field, a brief description of the function of representative circuits is as follows. An AND logic circuit produces an output signal when, and only when, all of a plurality of input signals are present. An inverter logic circuit provides the opposite signal at the output than that which is applied at the input. A NAND gate requires a signal at all inputs to provide a lack of signal at the output. Hence, an AND gate is a NAND gate with an inverter following. A NOR gate provides a lack of signal at the output when a signal is applied at either input. An OR gate can be considered as a NOR gate followed by an inverter. An OR gate provides a signal at the output when it has one or more inputs. Since the NAND, the NOR and the inverter can be obtained using a single transistor, this logic is used throughout the converter. When an AND gate is required, a NAND symbol is shown followed by an inverter. A flip flop or bistable circuit has "ON" and "OFF" or set and reset input terminals and "ON" and "OFF" output terminals, and produces an "ON" output signal in response to a signal applied at the "ON" input terminal and continues to produce the "ON" output signal even though the input signal at the "ON" input signal is removed until a signal is applied to the "OFF" input terminal. The flip flop circuit will then be turned "OFF" and produces an "OFF" output signal even though the signal at the "OF" input terminal is removed. The flip flop reverts to its initial state upon application of a signal to the "ON" input terminal. For further details on the construction and operation of various types of logic circuits reference is made to an article entitled "Static Switching Devices" by Robert A. Mathias, in Control Engineering, May 1957.

Six identical ring counters and two identical staircase generators 27–28 are used. Four of the counters, shown in FIG. 1 (counters 38–41), function to partly control the staircase generators 27–28 and accumulate the readout count as briefly described above. A fifth ring counter is used as the programmer 37 and a sixth ring counter 51 is used as part of a digital filter hereinafter described. One of the six identical ring counters is shown in detail in FIG. 6 and one of the two identical staircase generators 27–28 is shown in detail in FIG. 7 and are described hereinafter. For an understanding of the logic circuit 35, it is only necessary to understand that the ring counters (FIG. 6) each has two input leads 52 and 53 (input and reset) and twenty-one output leads, ten of which carry sustained outputs (leads 1S–10S) and eleven of which carry non-sustained outputs (leads 0D–10D). Leads 0D–10D of the counter 38 (FIG. 1) are shown as a single cable connected to the respective indicating device 42 (0–10,000 pounds), leads 0D–9D (lead 10D not used) of the counter 39 (FIG. 1) are shown as a single cable connected to the respective indicating device 42 (0–900 pounds), leads 0D–9D (lead 10D not used) of the counter 40 are shown as a single cable connected to the respective indicating device 42 (0–90 pounds), and leads 0D–9D (lead 10D not used) of the counter 41 are shown as a single cable connected to the respective indicating device 42 (0–9 pounds). Signals on the output leads of the counter which makes up the programmer 37 function to put the programmer 37 in any one of the seven positions indicated as 0–7 in FIG. 1. Leads 1S–10S of the counter 38 are shown as a single cable connected to both of the staircase generators 27–28 in FIG. 1 (leads 1S–10S first go through a tare device 52 described hereinafter) and are shown as counter 38 leads 1S–10S connected to control the staircase generator shown in FIG. 7. Leads 1S–9S of the counter 39 are shown as a single cable connected to both of the staircase generators 27–28 in FIG. 1 and as counter 39 leads 1S–9S connected to control the staircase generator shown in FIG. 7 (lead 10S not used). Leads 1S–9S of the counter 40 are shown as a single cable connected to both of the staircase generators 27–28 in FIG. 1 and as counter 40 leads 1S–9S connected to control the staircase generator shown in FIG. 7 (lead 10S not used). Leads 1S–9S of the counter 41 are shown as a single cable connected to both of the staircase generators 27–28 in FIG. 1 and as counter 41 leads 1S–9S connected to control the staircase generator shown in FIG. 7 (lead 10S not used). Each of the staircase generators 27 and 28 has an output lead connected as shown in FIG. 1 through the switch 29 to the summing junction 26. As indicated in FIG. 1, one of the staircase generator outputs is negative and the other is positive and as shown in FIG. 7 the negative output is on a lead 53 and the positive output is on a lead 54, i.e., the two staircase generators 27 and 28 are identical, but one generator utilizes the lead 53 and the other utilizes the lead 54. Signals on some of the output leads of the counter which makes up the programmer 37 function to help control the staircase generators 27–28; these signals are put on the three leads F (FIG. 1) to the staircase generator 27 and on the three leads F to the staircase generator 28 and on staircase generator input leads 55–57 (FIG. 7) when the programmer is in positions 3, 4 and 5, respectively.

When the converter is turned on, a time delay circuit TD18 senses the application of B+ and its output resets the programmer 37 (to position 0) through a NOR gate 58, resets two binary coded decimal BCD counters 59 and 60 (part of the digital filter hereinafter described) through an inverter 61, inhibits a clock 62 (FIG. 5) through a NOR gate 63 and an inverter 64, and resets flip flops 65–69 through a NOR gate 70 and an inverter 71. The output of the inverter 71 also resets the ring counters 38–41 and 51 (part of digital filter hereinafter described). The ring counter 38 is reset through a NOR gate 73 which also applies an input to an inverter 74 which supplies an output signal to reset the ring counter 39 through a NOR gate 75, to reset the ring counter 40 through a NOR gate 76, to reset the ring counter 41 through a NOR gate 77, and to reset the ring counter 51 through a NOR gate 78.

The programmer 37 in its reset or zero position applies a non-sustained signal on its output lead 0D (FIG. 2) to an inverter 79. The programmer must be in its zero position to accept any readout command signal.

An output from a NAND gate 80 (FIG. 2) is required to advance the programmer 37 to its position number 1. This output from the NAND gate 80 is derived in one of three ways depending on the mode of operation which is selected by means of the switch 47 as described above. An output from the NAND gate 80 requires that three conditions be met. A negative signal must be obtained from a line frequency synchronous switch 81. The negative signal is obtained by placing the switch 81 in the "OFF" position to tie the line to a negative supply or it is obtained by placing the switch 81 in the "ON" position to supply synchronous pulses derived from the A.C. power supply (synchronous pulses synchronized with the line frequency). The purpose of the switch 81 is to intiate a readout at the same instant of time based on the period of the power line frequency to provide rejection of any noise or hum from the power lines which may be introduced into the signal circuit. A second negative signal is provided from the inverter 79 to the NAND gate 80 indicating that the programmer 37 is in its zero position. The third negative signal is supplied to the NAND gate 80 by the flip flop 65 which is driven by the mode switch 47 and that is provided to latch on the third negative signal until a line frequency synchronous pulse is received.

The first mode of operation is the track mode (switch 47 in position "2"). In this mode, a readout signal is initiated by means of an output from variable time delay TD3 and an inverter 82 to the mode switch 47. Time delay TD3 is controlled by the knob 46 (FIG. 1) which regulates the frequency of readout (time delay TD3) and also the bandwidth (variable ganged resistor 31—FIG. 1). A readout is obtained every time that the timer TD3 times out. The bandwidth determines the response time of the system, the response time being defined as the time needed for the system, to settle out after a change in load upon the load cells 20. The variable filter (resistor 31 and capacitor 32) varies the bandwidth of the system and the converter converts the signal from the analog input signal source 21 to a digital representation during a time interval which is set by the timer TD3. There is an optimum ratio between the response time and the tracking or sampling time or stated another way there are optimum values for the time interval and the bandwidth requiring the time interval to be lengthened when the bandwidth is narrowed and vice versa. The adjustment means (knob 46 and its mechanical connection to the variable resistor 31 and timer TD3) so connects the variable filter and the timer for conjoint movement that movement of the adjustments means to select the optimum bandwidth maintains the optimum time interval or movement of the adjustment means to select the optimum time interval maintains the optimum bandwidth.

The second mode of operation is the demand mode (switch 47 in position "3"). In this mode, the indication is obtained by manual operation of contacts to place a signal on the input of the NOR gate 48. The NOR gate 48 applies a signal to a NAND gate 83 which already is partially enabled by the signal from the inverter 79 and which in turn provides a signal to set the flip flop 66 providing the necessary signal to the switch 47 to operate the NAND gate 80. The indication is maintained until the next demand signal is entered. In this mode, the timer is out of the circuit and turning the knob 46 (FIG. 1) only regulates the bandwidth by varying the resistor 31.

The third mode of operation is the demand-null mode (switch 47 in position "4") and when a demand is entered (signal from NOR gate 48), the signals from the NOR gate 48 and from the inverter 79 through the enabled NAND gate 83 set the flip flop 66. The signal from the set flip flop 66 is applied to NAND gates 84–86. The NAND gate 84 has an output, when the flip flop 66 is set and the switch 47 is in position "4," which is applied to a NOR gate 87 and serves to blank the indication (turns off lamps in indicating devices 42—FIG. 1) so that the operator will know a readout has been demanded, but a null condition does not yet exist. An output from the NAND gate 86 is obtained when an output from the flip flop 66, an output from the inverter 79 and an O.K. output from the comparator 43 (FIG. 1) are present (no output from comparator converted to O.K. signal by logic circuit). This O.K. output is derived from a NAND gate 88 (FIG. 3) which is enabled by signals from the comparator 43 after the signals are inverted by inverters 89 and 90 as described hereinafter. The output from the NAND gate 86 sets the flip flop 67 and is applied to a NAND gate 92 to only partially enable it. The output of the set flip flop 67 together with the output of the flip flop 66 and the signal from the switch 47 in position "4" produces an output from the NAND gate 85. This output enables a NOR gate 93 which in turn enables a NOR gate 94 to cause a solid state switch shown for the sake of simplicity as the mechanical switch 49 (FIG. 1) to open thus setting the time constant of the system according to the setting of the resistor 31 which is ganged with the display time control knob 46 (FIG. 1). The output of the flip flop 67 also is applied to the timer TD14 (establishes time of signal averaging) which after the manually set delay applies an input through an inverter 95 to the NAND gate 92. However, the NAND gate 92 cannot be completely enabled until it receives a signal from the NAND gate 86 which has all inputs present except the O.K. signal (null) from the NAND gate 88 that is derived from the comparator 43 (FIG. 1). When the NAND gate 92 is enabled at the null signal, it applies a signal to a NOR gate 96 which is transmitted through the switch 47 in position "4" to the flip flop 65 that in turn opens the NAND gate 80. The enabled NAND gate 80 applies an input to a NOR gate 97 which in turn enables a partially enabled NAND gate 98 (partially enabled by a clock pulse as hereinafter described) which applies a signal through an inverter 99 to advance the programmer 37 to position number 1.

The programmer signal 0D (FIG. 2) to the inverter 79 is removed when the programmer 37 is in position one and programmer signals 1D (non-sustained) and 1S (sustained) are applied to the logic circuit (FIG. 2). The readout cycle now continues in a standard fashion regardless of the setting of the mode switch 47. The programmer output 1D is applied to the NOR gate 70 to reset the flip flops 65–69 through the inverter 71, to reset the ring counter 38 through the NOR gate 73, the ring counter 39 through the inverter 74 and the NOR gate 75, the ring counter 40 through the inverter 74 and the NOR gate 76, the ring counter 41 through the inverter 74 and the NOR gate 77, and the ring counter 51 through the inverter 74 and the NOR gate 78, and to apply an input to a NAND gate 165. The programmer output 1S (sustained output remains for the rest of the readout cycle until the programmer is reset) is applied through inverters 100 and 101 to the NOR gate 87 to blank the indication and through the inverters 100 and 101 to a time delay TD22 which operates with no time delay to apply a signal to an inverter 102 to open the solid state switch 33 which is shown in FIG. 1 as a mechanical switch for the sake of simplicity, converting the amplifier 22 from an integrating to a hold amplifier. The output of the inverter 100 also is applied to a time delay TD25 which provides a short delay (approximately 0.3 millisecond) before a signal is applied to a NOR gate 103 whose output signal opens the solid state power supply switch 44 shown as a mechanical switch in FIG. 1 for the sake of simplicity. The delay provided by the time delay TD25 provides time for the switch 33 to open before the switch 44. The output of the inverter 100 also is applied to a time delay TD28 which provides a delay (approximately 2.0 milliseconds) after which the signal is applied to a lead 104 connected to the variable bandwidth circuit 25 shown in FIG. 8 hereinafter described (automatically changes the amplifier 24 (FIG. 1) from a wide band amplifier to a relatively narrow band amplifier thus affording a reduction in the noise level). The delay provided by the time delay TD28 allows the amplifier 24 to settle out to its value after the power supply switch 44 has been opened. The output of the inverter 100 also is applied to time delay TD27 which provides a delay (approximately 4.0 milliseconds) before applying a signal to the AND gate 165 (already partly enabled by the signal from the NOR gate 70). The output of the NAND gate 165 advances the programmer into position 2 through the NOR gate 97, the partially enabled NAND gate 98 (partially enabled by a clock pulse as hereinafter described), and the inverter 99.

Clock pulses are generated by the free-running clock 62 (FIG. 5) having pulses controlled by the NOR gate 63, the inverter 64, an inverter 105, a NAND gate 106, an inverter 107, a one-shot or mono-stable circuit 108, a NAND gate 109, an inverter 110, and a one-shot or mono-stable circuit 111. Two clock outputs are provided. Clock output number one is obatined from the inverter 107 and advances and resets the programmer 37 and the binary coded decimal BCD counters 59 and 60. The other logic functions are under control of clock output number two which is obtained from the inverter 110. The clock 62 generates unsymmetrical clock pulses each having a pulse width of approximately ten microseconds with a repetition frequency of approximately fifteen kilocycles per second. In other words, the clock pulses occur at intervals of approximately seventy microsecodns. These clock pulses are fed to the NAND gates 106 and 109. Each of these NAND gates also have an input drive from a one-shot circuit which is controlled from the output of the opposite NAND gate. The NAND gate 106 controls the one-shot circuit 108, the output of which is fed to the NAND gate 109. The output of the NAND gate 109 controls the one-shot circuit 111, the output of which is an input to the NAND gate 106. These one-shot circuits serve to inhibit the output of the opposite clock line. For instance, if a clock pulse is obtained from the inverter 107, the one-shot circuit 108 provides a positive inverted output which blocks the NAND gate 109 and the inverter 110 thus preventing clock output number two. By the same token, in the event of a clock pulse from the NAND gate 109 and the inverter 110, a pulse is obtained from the output of the one-shot circuit 111. This pulse is applied to the NAND gate 106 and inhibits the NAND gate 106 to prevent clock output number one. The duration of the one-shot circuit 111 is approximately thirty microseconds. This is sufficient to overlap the complete ten to fifteen microsecond pulse width of the clock pulse yet is short enough not to inhibit the next clock pulse which will occur after approximately seventy microseconds. The output of the one-shot circuit 108 is maintained for approximately six hundred microseconds. This output in addition to being fed to the NAND gate 109 is also fed back to the NOR gate 63 which in turn feeds the inverter 64 to inhibit the clock 62. The clock has an inhibit gate which is designed in such a manner that the full ten to fifteen microsecond pulse width is obtained even though an inhibit pulse is applied almost immediately after the leading edge of the clock pulse starts. Thus, every time a clock pulse occurs from the inverter 107 (output number one), the clock is inhibited for a period of approximately six hundred microseconds. This six hundred microseconds is provided to allow the transients generated in the analog section due to the switching of the programmer 37 to settle out before the next decision providing clock pulse from the inverter 110 can be applied to the various logic gates.

Pulses are normally derived from the inverter 110 by virtue of an input on the NAND gate 109 from the one-shot circuit 108, the input from the clock 62, and the input from the inverter 105. However, when a programmer advance pulse occurs, an output is obtained on either the NOR gate 97 or a NOR gate 112. This signal is passed through an OR gate 113 (FIG. 4), the output of which is in turn applied to the NAND gate 106 and to the inverter 105. This causes the output of the inverter 105 to inhibit the NAND gate 109 and allows an input of the NAND gate 106 to go negative thus enabling the next clock pulse to feed through the NAND gate 106 and in turn through the inverter 107 to provide a clock output number one pulse. This clock number one pulse is then applied to the NAND gate 98 together with the advance signal to allow the programmer 37 to advance. Thus a transient signal appearing at the output of the NOR gate 97 or the NOR gate 112 is prevented from advancing the programmer 37 until the next clock pulse occurs. This will happen at a minimum of sixty microseconds from the time of the transient. In other words, the advance signal at the output of the NOR gate 112 or the NOR gate 97 must be a steady sustained signal in order to allow the programmer to advance. The OR gate 113 has a second input from the output of a NOR gate 114. The output of the NOR gate 114 represents a reset signal and is derived either from a below zero signal as obtained from the flip flop 68; by an over signal as indicated by output from the flip flop 69 or by a reset signal provided by a manually operable reset control 115 which is connected to the NOR gate 94 through a timer 166 and an inverter 167. A fourth input through the NOR gate 114 comes from the programmer 37 when in position number seven.

The programmer 37 must be advanced to position seven to reset. The remainder of the positions, i.e., 8–10, are tied to position seven as indicated in FIG. 1 so that, in case the programmer advances through position seven by some stray transient, the programmer will not lock up. Also, if the programmer were allowed to reset at position six, a stray transient might reset it prematurely.

The advancing of the programmer 37 to its position two removes the 1D signal but the 1S signal to the inverter 100 is maintained throughout the remainder of the readout cycle thus maintaining the switches 33 and 44 open, the signal on the lead 104, and maintaining the indication blank. The 2D signal from the programmer is applied to an inverter 116 which applies an output to NAND gates 117 and 118. The system determines whether the output of the load cells 20 indicates above or below zero load while the programmer is in position two as follows: If the output of the comparator 43 is positive, which will require the use of the negative voltage from the staircase generator 27, the positive comparator signal is applied to the NAND gate 118 through the inverter 89 together with the output of the inverter 116. This produces an output signal from the NAND gate 118 which sets the flip flop 68. When the flip flop 68 is set, it represents a negative staircase condition. The inverted output of the flip flop 68 is applied to a NOR gate 119. The output of this gate is in turn applied to a NAND gate 120. The output of the NOR gate 119 applied to the NAND gate 120 partially enables the NAND gate 120 which therefore is under the control of a NOR gate 121. The inverted output of the flip flop 68 is also applied to an OR gate 122 which turns on red lamps indicating a below zero condition. If a negative staircase were not being used, the inverted output from the flip flop 68 would also run over to the NOR gate 114. This would reset the programmer 37 and the BCD counters 59 and 60 through a NAND gate 123, which is under control of the clock output number one from the inverter 107, and through a one-shot or mono-stable circuit 124 which assures a pulse of sufficient duration to reset the counters. However, the red lamps would remain on until the next readout cycle or unitil the indication was blanked by means of an external signal. If a negative staircase is used, this connection to the NOR gate 114 is omitted and the readout cycle continues. The inverted output from the flip flop 68 is also applied to a NOR gate 125. The output from this gate is applied to the NAND gate 117. This signal together with the signal from the inverter 116 produces an output signal from the NAND gate 117 which is applied to the NOR gate 97. The output of the NOR gate 97 is applied to the NAND gate 98. The second input of the NAND gate 98 is derived from the inverter 107 (clock output number one—pulse approximately six hundred microseconds). The output of the NOR gate 97 is also applied to the OR gate 113, the output of which is applied to the inverter 105 and the NAND gate 106. Since the output of the one-shot circuit 111 is negative, the NAND gate 107 provides an output coincident with the next pulse from the clock 62. This clock pulse is transmitted through the inverter 107 to the input of the NAND gate 98 enabling the NAND gate 98. The output of the enabled NAND gate 98 is applied to the inverter 99 to advance the programmer 37 to position three. The output of the NAND gate 106 also is applied to the one-shot circuit 108 which inhibits the clock 62 as described above permitting the logic circuitry to settle out before the next operation occurs.

If the signal from the comparator 43 had been negative or O.K. instead of positive, a positive potential would energize the NOR gate 125 the output of which together with the output from the inverter 116 provides an output from the NAND gate 117. The output from the NAND gate 117 is applied to the NOR gate 97 which advances the programmer to position three in the same manner as described before. However, this time the flip flop 68 has remained reset so that the output of the NOR gate 121 is continuous and so that the output of the NAND gate 120 is under the control of the output of the NOR gate 119 which is derived from the positive output of the comparator 43. Hence, the output of the NAND gate 120 is identical to the output of the positive terminal of the comparator. When the flip flop 68 is set, the output of the NAND gate 120 is identical to the output of the negative terminal of the comparator.

In programmer position zero, a readout command is accepted; in programmer position one, the counters and flip flops are reset; and in programmer position two, a determination is made whether the output voltage from the load cells indicates an above or below zero load upon the weighing scale. When the clock pulse advances the programmer to position three, the staircase switch 29 (FIG. 1) is still open.

With the programmer 37 in position three, output 3S is applied through an inverter 126 to NAND gates 127 and 128. The second input to the NAND gate 127 is obtained from the normal output of the flip flop 68. This output is of the proper level to energize the NAND gate 127 when the flip flop 68 is set. Therefore, when the flip flop 68 is set, the NAND gate 127 produces an output and opens the gate to the negative staircase generator 27 (FIG. 1). Since the negative and positive staircase generators 27 and 28 are identical, only one generator is shown in detail in FIG. 7. Such staircase gate (29a) is shown in FIG. 7 hereinafter described, however, for the sake of simplicity both staircase gates are represented by the switch 29 in FIG. 1 which now is closed to apply staircase counterbalancing voltage (— or + depending on which staircase generator is used) to the summing junction 26. If the flip flop 68 remains in its reset condition, the inverted output is on the proper level to open the NAND gate 128 which opens the gate to the positive staircase generator 28. Output 3S is sustained through the remainder of the readout cycle. Therefore, the appropriate staircase gate remains open for the remainder of the readout cycle. Programmer signal 3D is applied to an inverter 129 and to the staircase generator as shown in FIG. 7 and as indicated in FIG. 1 (one of the inputs F). The input to the staircase generator causes it to add an increment of counterbalancing voltage equal to one thousand digits to the summing junction 26 (FIG. 1). The output of the inverter 129 enables an inverter 130 and also is applied to a NAND gate 131. A second input to the NAND gate 131 is a clock signal from the inverter 110 and a third input to the NAND gate 131 is derived from an inverter 132 which obtains its input signal from the NAND gate 120 (output of the NAND gate 120 follows the output of the positive terminal of the comparator 43 when the load cell output is above zero). The output of the inverter 132 therefore follows the inverted output of the positive signal from the comparator. Therefore in order to open the NAND gate 131 a positive signal must be present from the comparator. This positive signal allows the clock pulses to pass through the NAND gate 131, enter a NOR gate 133, and feed into the ring counter 38 (1000 counter). The sustained outputs of the ring counter 38 shown as COUNTER 38 outputs 1S–10S in FIG. 7 cause the staircase generator to product increments of voltage each equal to one thousand digits that are applied to the summing junction 26.

If the load cell output is within the range of the converter, at some point the voltage generated by the staircase generator will exceed the signal output from the amplifier 24 and a phase reversal will occur at the comparator output. The positive output of the comparator will become negative which in this case is a true signal thus causing the output of the inverter 132 to go positive and closing the NAND gate 131 thereby preventing any additional pulses from being fed to the ring counter 38. At the time this phase reversal occurs at the output of the comparator, the resulting negative signal at the output of the NAND gate 120 is applied to a NAND gate 134 together with the negative output from the inverter 129. As a result an output is obtained from the NAND gate 134 which is applied to the NOR gate 97 to advance the programmer to position four. Again the advance of the programmer must await the arrival of a clock output number one pulse which is obtained from the inverter 107 and applied to the NAND gate 98. Since clock one and two pulses cannot occur simultaneously, but are seperated by at least the off time of the clock, the programmer cannot advance due to an overshoot or transient which may be generated during the input to the counter 38. This time between clock pulses also allows the output of the staircase generator to assume its steady state value. If in position three the comparator output polarity did not reverse, the count would continue until ten inputs had been entered into the counter 38. At this point a positive output from the tenth position would be obtained and applied to an inverter 135a (safety interlock). This in turn is applied to a time delay TD53 which provides approximately twenty-five microseconds delay before applying a signal to a NAND gate 135. This delay prevents opening of the NAND gate 135 on the same clock pulse which advanced the counter 38 to position ten. The next pulse out of the NOR gate 133 therefore will provide the second negative input to the NAND gate 135 which will allow the flip flop 69 to change to its set position. The resulting output of the flip flop 69 is applied to the OR gate 122, the output of which is in turn applied to the red lamps thus providing an indication that the unit has gone overweight. The output of the flip flop 69 also is applied to the NOR gate 114. The output of the NOR gate 114 is one of two signals applied to the NAND gate 123. The second signal, a clock output number one pulse, must occur in order to obtain an output from the NAND gate 123. This again prevents transients from operating the NAND gate 123 and since the clock pulse one and clock pulse two cannot occur simultaneously, the output from the NAND gate 123 cannot occur during the same clock pulse as the original overpulse. The output from the NAND gate 123 switches the one-shot circuit 124. The inverted output of the one-shot circuit 124 is fed into the NOR gate 58, the output of which resets the programmer and the BCD counters 59 and 60 through the inverter 61. Although the programmer has been reset, the flip flop 69 will not be reset until the programmer advances to its number one position which will occur only after the next readout cycle is initiated. Therefore, the red lamps remain lit.

If the counter 38 does not count ten pulses, the programmer is advanced to position four as described above. Programmer signal 3D is removed from the staircase generator (FIG. 7) so that an increment of staircase voltage worth one thousand digits is lost. The count in the counter 38 and the increments of staircase voltage now agree because every count in the counter 38 produces a sustained output to the staircase generator, e.g., three counts in the counter 38 produces COUNTER 38 inputs 1S, 2S and 3S as indicated in FIG. 7 to the staircase generator producing in turn three increments of staircase voltage worth three thousand digits which are applied to the summing junction 26 (FIG. 1). Thus, the staircase generator is generating a voltage proportional to the number of graduations which is within one thousand digits of the correct reading. Programmer output 4D is applied to an inverter 136 whose output is applied to an inverter 137 which applies the 4D input to the staircase generator as indicated in FIG. 7 to generate an increment of voltage worth one hundred digits. The output of the inverter 136 also is applied to a NAND gate 138. A second input to the NAND gate 138 is the output of the inverter 132 (inverted output of the + side of the comparator 43). A third input to the NAND gate 138 is a clock output number two pulse from the inverter 110. Each clock output number two pulse produces a pulse from the NAND gate 138 which is fed to a NOR gate 139 that delivers the pulses to the ring counter 39 (100 counter). The sustained outputs of the ring counter 39 shown as COUNTER 39 outputs 1S-9S in FIG. 7 cause the staircase generator to produce increments of voltage each equal to one hundred digits that are applied to the summing junction 26. If the counter 39 fills up to its tenth position and the polarity of the comparator 43 has not yet reversed, an output is applied to a one-shot circuit 140 which applies an input to the NOR gate 133 to add one count to the counter 38 (1000 counter). The output from the one-shot circuit 140 also is applied to the NOR gate 75 and to a NOR gate 141. The NOR gate 75 opens and the counter 39 is reset. An overload which operates the one-shot circuit 140 also is transmitted to the NOR gate 141. This signal is in turn transmitted to a NAND gate 142 which has its second input tied to the inverter 136. The output of the NAND gate 142 is applied to the NOR gate 112 resulting in the programmer advancing to position five. If a count of ten is not reached in the counter 39, clock number two pulses are applied to the NAND gate 138 and a negative output is received from the inverter 132. Counts then are added until the output from the comparator 43 reverses in phase or becomes equal indicating an O.K. This may also happen (phase reversal) when the false step controlled by the inverter 137 is added.

A second input exists for the NOR gate 141. This is the signal equivalent to the inverted positive line from the comparator 43. If this line goes positive which would happen if the comparator positive output went negative, the NOR gate 141 will again open enabling the NAND gate 142 which will advance the programmer to position number five. Again the output signal of the NAND gate 142 is applied to the NOR gate 112 which is in parallel with the NOR gate 97. The two gates are required simply because a single gate will not accommodate a fan in of seven signals. The output of the NOR gate 112 is coupled into the NAND gate 98 which is in turn coupled through the inverter 99 to the programmer input. As described before, the NAND gate 98 requires a clock output number one pulse be present before the programmer may be advanced. When the programmer advances to position five, output 4D is removed and the voltage output equivalent to one hundred digits which was generated in the staircase generator from the output of the inverter 137 is removed. The removal of this step equivalent to one hundred graduations reverses the phase of the comparator which will again provide a positive output at the positive terminal or a negative output on the positive inverted line which is the output of the inverter 132. The count in the counter 39 and the 100 digit increments of voltage now agree because every count in the counter 39 produces a sustained output to the staircase generator, e.g., three counts in the counter 39 produces COUNTER 39 inputs 1S, 2S and 3S as indicated in FIG. 7 to the staircase generator producing in turn three increments of staircase voltage worth three hundred digits which are applied to the summing junction 26 (FIG. 1).

The programmer in position five puts a signal 5D on the input of an inverter 143 which applies an input to a NAND gate 144 and an inverter 145. The output of the inverter 145 is applied to the staircase generator as input 5D in FIG. 7. This results in a voltage step being applied to the summing junction 26 which is equivalent to ten graduations. The output of the inverter 143 also is applied to a NAND gate 146 which requires an output from a NOR gate 147 to advance the programmer to position six. The NOR gate 147 receives a signal when the comparator output changes phase, the positive terminal becoming minus or when the counter 40 (tens decade) is overloaded as indicated by an output from the tenth position of the counter. In this case an output from position number ten operates a one shot circuit 148 which provides the required input into the NOR gate 147. This will provide the second required input into the NAND gate 146. The output of the NAND gate 146 is applied to the NOR gate 112 and the programmer is advanced. In the event of an overload in counter 40 as indicated by the operation of the one-shot circuit 148, the inverted output also is applied to the NOR gate 139 which adds another count to the counter 39 (resulting in the addition of a one hundred count step to the staircase generator). The output from the one-shot circuit 148 also is applied to the NOR gate 76, causing the counter 40 to be reset. Thus, the ten counts with ten digits each for a total of one hundred digits are replaced by a single count from the counter 39 equal to one hundred digits. As mentioned before, the output of the inverter 143 is applied to one input of the NAND gate 144. A second negative input is derived from the inverted positive line from the inverter 132. The third input to the NAND gate 144 is the clock output number two. Therefore, a pulse train is entered into a NOR gate 149 and transmitted to the counter 40 as long as the programmer is in position five and the positive terminal of the comparator is positive. When the positive terminal of the comparator becomes negative, which means that the staircase output has exceeded the output from the amplifier 24, the NAND gate 144 is closed. Therefore additional pulses cannot be applied to the counter 40. Also, the output of the inverter 132 which now is plus is applied to the NOR gate 147 which applies the required second negative signal to the NAND gate 146, the output of which is applied to the NOR gate 112 which advances the programmer to position six.

When the programmer is in position six, the signal applied to the inverter 143 is removed resulting in the removal of a voltage step equivalent to ten digits generated from the staircase generator. With the programmer in position six, signal 6D is applied to an inverter 150. The resulting output of the inverter 150 is applied to a NAND gate 151. A second input to the NAND gate 151 is derived from an inverter 152 which obtains its input from the comparator. This signal is derived from the output of a NAND gate 153 connected to the NAND gate 88 through an inverter 154 and is present when the positive terminal of the comparator is plus and the negative terminal of the comparator is minus. An O.K. signal is derived from the comparator by applying the positive and negative outputs of the comparator to the NAND gate 88. If neither the positive or negative outputs are minus, in other words both outputs are plus, the NAND gate 88 provides a positive output signal indicating an O.K. condition exists within the comparator. By combining the output obtained from the inverter 132 with the inverted O.K. output, a signal equivalent to the negative comparator output is obtained from the NAND gate 153. This is equivalent to the inverted negative comparator output. A negative signal from the NAND gate 120 means that the staircase generator output has exceeded the output of the amplifier 24. A minus output from the negative line of the comparator results in a positive output from the NAND gate 153. A positive output from the NAND gate 153 means that the staircase output is less than the output from amplifier 24 and that additional step are required from the staircase generator. By the same token a positive output from the NAND gate 120 means that the comparator output could be negative or O.K. A minus output from the NAND gate 153 means that the comparator output could be positive or O.K. Since in the decades greater than the unit decades, an additional count is required if the comparator output is negative or O.K. (since the false or initial step will be subtracted), an inverted positive output is used as the signal of polarity reversal. In the units decade, a count is required only if the comparator output is negative. If the output is positive or O.K., the staircase voltage exceeds or equals the output of the amplifier 24. Therefore, the output of the NAND gate 153 is used to determine if additional steps are required from the staircase generator when counting in the units decade.

In position six, the programmer activates the units counter 41. A digital filter is used on the units counter 41 to average noise, etc. from the amplifier 24. The digital filter comprises the ring counters 41 and 51 and the BCD counters 59 and 60. Programmer signal 6D is applied to one input of the NAND gate 151. A second input to the NAND gate 151 is obtained from the invention 152 which obtains its input from the NAND gate 153 so that the second input to the NAND gate 151 is negative when the output of the comparator is negative. Accordingly, a pulse train passes through the NAND gate 151 from the clock output number two line as long as the comparator output is negative. The outpt of the NAND gate 151 is applied to the counter 41 through an inverter 155. The counter 41 controls the staircase generator and adds a step voltage equivalent to one unit for each count received (counter 41 leads 1S9S connected to the staircase generator in FIG. 7).

The pulse train applied to the counter 41 also is applied to the BCD counter 59 through an inverter 156. The BCD counter 59 is connected as a decimal counter. The output of the BCD counter 59 is connected to the ring counter 51 through an inverter 157. The counter 51 drives an indicating device 158. When a phase reversal is obtained from the comparator or when an O.K. signal is obtained from the NAND gate 88 which indicates that neither positive or negative outputs from the comparator are present, the negative signal from the inverter 152 is removed from the NAND gate 151 thus closing this gate. However, a negative signal is applied to a NAND gate 159 which already has a negative signal from the inverter 150 applied to it. The clock output number two line also is applied to the NAND gate 159. The output of the NAND gate 159 is tied into a one-shot circuit 160. The number ten position of the counter 41 also is tied into the OR input of the one-shot circuit 160. Therefore, either an O.K. or a positive output from the comparator or a count to ten operates the one-shot circuit 160. The inverted output of the one-shot circuit 160 is coupled to the NOR gate 77 which resets the counter 41. The inverted output of the one-shot circuit 160 also is coupled into the one-shot circuit 108 which causes a delay of approximately six hundred microseconds before the occurrence of the next clock pulse. This allows the counter 41 to be reset and recover. The normal output of the one-shot circuit 160 is coupled into the BCD counter 60 through an inverter 161. An output from positions 2 and 8 of this counter opens a NAND gate 162. An output from positions 2 and 8 from the BCD counter 60 represents a total count of ten in this counter. Therefore coincidence of the staircase output and the output from the amplifier 24 as indicated by an O.K. or positive output from the comparator or a count to ten in the units counter 41 occurring ten times will provide an output from the NAND gate 162. This output from the NAND gate 162 together with the negative output from the inverter 150 is impressed upon the NAND gate 163. The output from the NAND gate 163 couples into the NOR gate 112 the output of which is applied to the NAND gate 98 to advance the programmer to position seven. The output from the NAND gate 163 allows a clock output number one pulse to be obtained. This clock pulse is applied to the NAND gate 98 allowing the programmer to advance to position seven. As we have seen, the units counter 41 has counted to coincidence and has been reset to recount for a total of ten counts. The total number of counts to the units counter 41 also have been fed into the BCD counter 59 which is another decimal counter. Each time this counter counts to ten a carry pulse is obtained which is coupled to the counter 51 through the inverter 157. This pair of counters can be considered as a counter capable of counting to ninety-nine with the BCD counter 59 being the units counter and the ring counter 51 being the tens counter. Therefore, we ignore the count in the units counter and look only at the count derived in the tens counter. In effect, we have divided the total count by ten. If a total of one hundred counts are applied to the counters 41 and BCD counter 59, counter 51 registers an output in its number ten position. This output is coupled into a one-shot circuit 164. The inverted output of the one-shot circuit 164 adds one count to the tens counter 40 by means of the NOR gate 149 which results in one additional step equivalent to ten digits being applied to the summing junction 26 from the staircase generator and the output from the one-shot circuit 164 also resets the counter 51 through the NOR gate 78. Thus, ten has been added to the indication by means of the tens counter 40 and the counter 51 which controls the units indication has been reset to zero. The one hundred pulses out of the inverter 155 represents a total of ten counts in the units decade. Thus, the proper number of counts have been transferred into the staircase generator. When the programmer is advanced to position seven, the output 7D is applied to the NOR gate 114. This output is applied to the NAND gate 123. The second input of the NAND gate 123 is the clock output number one line. Thus an output from the NAND gate 123 must await the next clock pulse succeeding the one which advanced the programmer to position seven. The output of the NAND gate 123 fires the one-shot circuit 124 which provides an input to the NOR gate 58 to reset the programmer. The output of the NOR gate 58 resets the BCD counters 59 and 60 through the inverter 61.

With the programmer reset to the zero position, the readout cycle is complete.

To summarize the counting, let us say that a load weighing 9982.6 pounds is placed upon the weighing scale. Counting starts when the programmer 37 reaches position three. Programmer input 3S (FIG. 3) closes the staircase switch 29 and programmer input 3D (FIGS. 3 and 7) causes the staircase generator to add a thousands place voltage step (false step) to the summing junction 26. Since more thousands place steps are needed, input 3D holds the gate to the thousands counter 38 open to admit clock pulses and the sustained outputs of such counter (COUNTER 38 outputs 1S–10S in FIG. 7) cause the staircase generator to add additional thousands place voltage steps to the summing junction 26 until the comparator 43 senses that one too many voltage steps has been added, i.e., there are nine counts in the thousands counter 38 corresponding to the nine in the thousands place of the 9982.6 pounds example, but there are ten staircase voltage steps applied to the summing junction 26 (one too many).

The programmer 37 then is advanced to position four. Non-sustained programmer input 3D is lost to remove the false or one too many thousands place staircase voltage step from the summing junction 26, but the sustained programmer input 3S is retained to keep the count of nine in the thousands counter 38 and the nine staircase voltage steps impressed on the summing junction 26. Programmer input 4D causes the staircase generator to add a hundreds place voltage step (false step) to the summing junction 26. Since more hundreds place steps are needed, input 4D holds the gate to the hundreds counter 39 open to admit clock pulses and the sustained outputs of such counter (COUNTER 39 outputs 1S–9S in FIG. 7) cause the staircase generator to add additional hundreds place voltage steps to the summing junction 26 until the comparator 43 senses that one too many voltage steps has been added, i.e., there are nine counts in the hundreds counter 39 corresponding to the nine in the hundreds place of the 9982.6 pounds example, but there are ten staircase voltage steps applied to the summing junction 26 (one too many).

The programmer 37 then is advanced to position five. Non-sustained programmer input 4D is lost to remove the false or one too many hundreds place staircase voltage step from the summing junction 26, but the sustained programmer inputs are retained to keep the count of nine in the thousands counter 38, the count of nine in the hundreds counter 40, and the corresponding staircase voltage steps impressed on the summing junction 26. Programmer input 5D causes the staircase generator to add a tens place voltage step (false step) to the summing junction 26. Since more tens place steps are needed, input 5D holds the gate to the tens counter 40 open to admit clock pulses and the sustained outputs of such counter (COUNTER 40 outputs 1S–9S in FIG. 7) cause the staircase generator to add additional tens place voltage steps to the summing junction 26 until the comparator 43 senses that one too many voltage steps has been added, i.e., there are eight counts in the tens counter 40 corresponding to the eight in the tens place of the 9982.6 pounds example, but there are nine staircase voltage steps applied to the summing junction 26 (one too many).

The programmer 37 then is advanced to position six. Non-sustained programmer input 5D is lost to remove the false or one too many tens place staircase voltage step from the summing junction 26, but the sustained programmer inputs are retained to keep the count of 998 in the thousands, hundreds and tens counters 38–40, respectively, and the corresponding staircase voltage steps impressed on the summing junction 26. No false steps are needed when counting in the units place. Since units place steps are needed, input 6D holds the gate to the units counter 41 open to admit three clock pulses and the sustained outputs of such counter (COUNTER 41 outputs 1S–9S in FIG. 7) cause the staircase generator to add three additional units place voltage steps to the summing junction 26. The comparator 43 indicates an O.K. or an over condition causing a count to be registered in the BCD counter 60 and resetting the counter 41. Resetting the counter 41 requires additional units place voltage steps. Pulses are applied to the counter 41 until three units place voltage steps are obtained at which time the comparator 43 indicates O.K. or over causing another count to be entered in the BCD counter 60 and resetting the counter 41. This process repeats for a total of ten cycles as indicated by a count of ten in the BCD counter 60. The BCD counter 59 and the ring counter 51 accumulate the total number of counts entered into the counter 41. The units count of the counters 51 and 59 is discarded and the tens count is displayed in the indicating device 42. This provides a units indication which is the average of ten readouts of the units decade. The count in the counters now is 9983.0 corresponding to the weight of 9982.6 pounds. The count of 9983.0 is displayed on indicating devices 42 (FIG. 1) which can be of any conventional design, such as lamps of the scoreboard type.

When the programmer is advanced to position seven, signal 7D (FIG. 5) resets the programmer to its zero position wherein all of the sustained outputs are lost, switch 29 opens and switches 33 and 44 close (switch 44 closes first).

Figure 6:
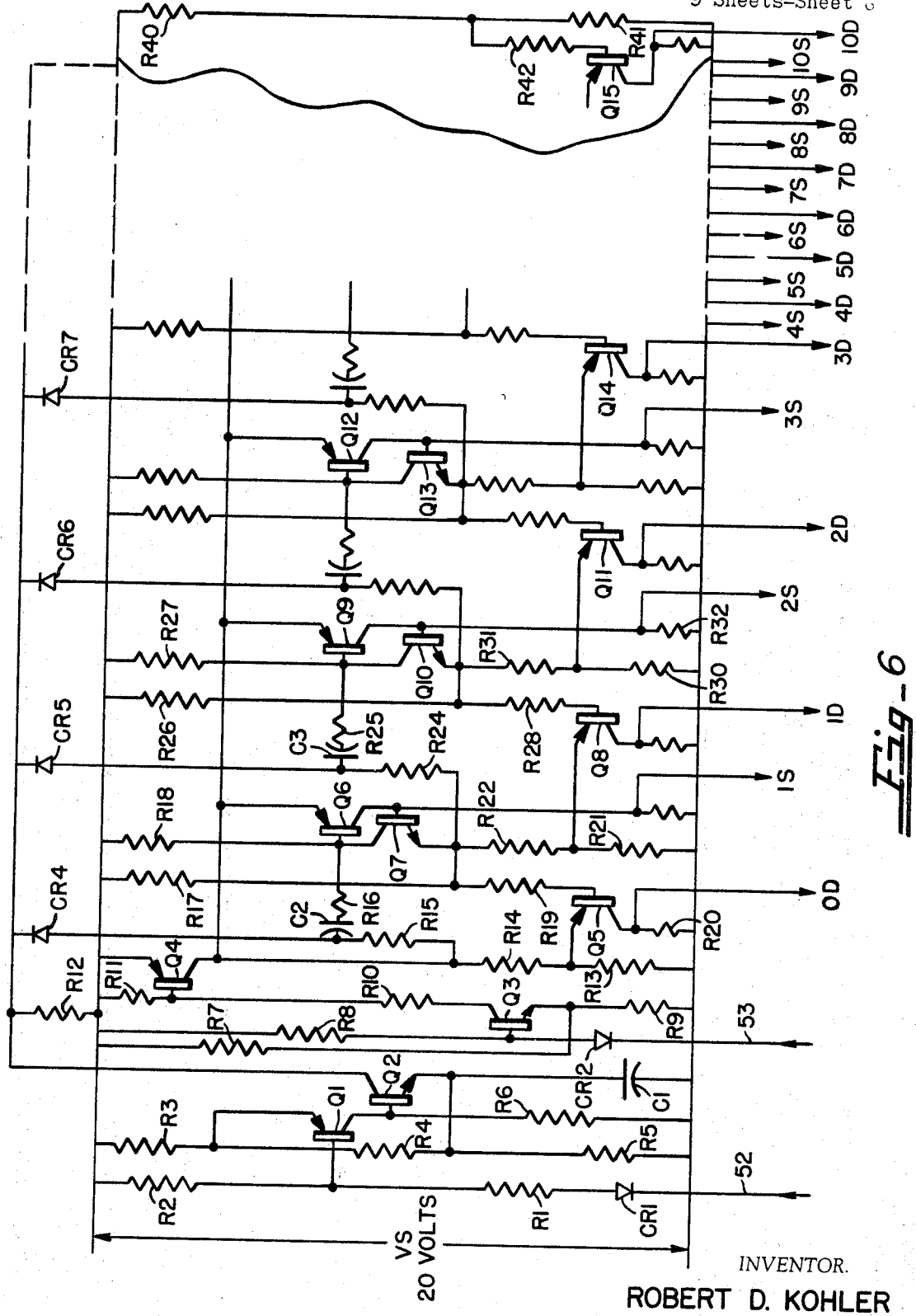
FIG. 6 is a schematic diagram of one of the four identical counters shown in FIG. 1.

One of the six identical ring counters (counters 38–41 and 51 and programmer 37 which is a ring counter) is shown in detail in FIG. 6. The ring counter has two input leads 52 and 53 (input and reset) and twenty-one output leads, ten of which carry sustained outputs (leads 1S–10S) and eleven of which carry non-sustained outputs (leads 0D–10D). This ring counter differs from the conventional ring counter in that as the count proceeds the stages do not turn off but rather remain on to put sustained outputs on the leads 1S–10S until at the tenth count all ten stages are on. However, as the count proceeds, only one of the output leads 0D–10D carries a signal at any one time. A reset pulse on the lead 53 is then required to reset all the stages.

The counter includes a pair of transistors Q1 and Q2 which form the input pulses supplied on the lead 52 and transfer the count, a pair of transistors Q3 and Q4 which are part of a reset circuit, and ten output stages. The first of such output stages includes transistors Q6 and Q7, the second of such output stages includes transistors Q9 and Q10, and the third of such output stages includes transistors Q12 and Q13. The rest of such output stages are not shown, except for their output leads, because they are duplicates. Transistors Q5, Q8, Q11 and Q14 decode the condition of the respective stages to provide a single decimal output. The rest of the corresponding decoding transistors, except for a transistor Q15 at the end of the counter, are not shown because they are duplicates.

The counter is energized from a supply VS, shown as 20 volts as an example, and includes the two transistors Q1 and Q2 which form the input pulses supplied on the lead 52 and transfer the count through the counter. Resistors R3, R4 and R5 are connected across the voltage supply VS as a voltage divider to establish a bias level at the emitters of the transistors Q1 and Q2. A resistor R2 holds the base of the transistor Q1 in a back biased condition causing the transistor Q1 to be turned off. A resistor R6 has zero current flowing through it when the transistor Q1 is off. Thus, the base to emitter junction of the transistor Q2 is reverse biased causing the transistor Q2 to be turned off. An input signal is applied from the lead 52 to the base of the transistor Q1 through a diode CR1 and a resistor R1 which limits the current that can be drawn from the base of the transistor Q1. The diode CR1 prevents interaction of the bases of input transistors when a number of counters are tied in parallel. When a negative input pulse is applied to the lead 52, the base to emitter junction of the transistor Q1 becomes forward biased turning the transistor Q1 on and causing current to flow through the resistor R6. This forward biases the base to emitter junction of the transistor Q2 thus allowing collector current to flow in this transistor. A capacitor C1 holds up the voltage on the emitter of the transistor Q2 allowing more reliable operation of the circuit. The collector of the transistor Q2 which is tied to the cathodes of a triggering diode (CR4, CR5, CR6, CR7, etc.) for each stage thus will go to a voltage level determined by the values of the resistors R3, R4 and R5. This voltage level typically is 10 volts for the 20 volts example supply.

Transistors Q3 and Q4 are part of the reset circuit. Resistors R7 and R9 determine the voltage level to which the emitter of the transistor Q3 is returned. A resistor R8 forward biases the emitter to base junction of the transistor Q3 thus turning the transistor Q3 on which then draws collector current through resistors R10 and R11 and from the base of the transistor Q4. The resistor R10 limits the current drawn from the base of the transistor Q4 while the resistor R11 provides a leakage path for the base leakage current of the transistor Q4 when the transistor Q4 is in its off condition. A reset pulse is a negative pulse and is applied to the lead 53 to reverse bias the base to emitter junction of the transistor Q3 through a diode CR2. The purpose of the diode CR2 is to prevent interaction between counters when a number of counters have their reset lines tied together. When the base to emitter junction of the transistor Q3 is reverse biased, this transistor turns off and current is no longer drawn out of the base of the transistor Q4. The resistor R11 reverse biases the base to emitter junction of the transistor Q4 and thus allows the transistor Q4 to turn off. The emitters of the transistors Q6, Q9, Q12 and the remaining counting stages are tied to the collector of the transistor Q4. Thus, when the transistor Q4 stops conducting, the current path for the transistors Q6, Q9, etc. is eliminated and the stages are reset.

Initially the transistors Q1 and Q2 are off and the transistors Q3 and Q4 are on. The voltage at the collector of the transistor Q4 is nearly equal to the supply voltage. This means that the voltage at the junction of resistors R14 and R15 is approximately at the level of the supply voltage VS. The voltage at the anode of the diode CR4 also will be at this potential. The voltage of the cathode of the diode CR4 will be at VS, since a resistor R12 pulls the cathode of this diode up to this level. Resistors R17, R22 and R21 form a voltage divider to set a bias level for the emitter of the transistor Q7 (first counting stage). A resistor R19 also is connected to the emitter of the transistor Q7. The potential at this point may be approximately 7 volts for the 20 volt supply although this value depends on the value of the resistors used. The anode of the diode CR5 also will be at this 7 volt potential as will the anodes of the diodes CR6, CR7, etc. Since the anode of the diode CR4 is approximately at the voltage VS, and the base of the transistor Q6 also is at approximately VS, since it is tied to this supply voltage through a resistor R18, a capacitor C2 has approximately zero volts across it.

When the first input trigger pulse arrives, the transistors Q1 and Q2 turn on pulling the collector of the transistor Q2 down to approximately 10 to 20 volts. The diode CR4 conducts because the junction of the resistor R15 and the capacitor C2, connected to the diode CR4, is at about 20 volts, pulling current through the resistor R15, the capacitor C2 and a resistor R16 from the base of the transistor Q6. The diode CR5 does not conduct because the junction of a resistor R24 and the capacitor C3, connected to the diode CR15, is at about 7 volts. The rest of the corresponding diodes CR6, CR7, etc. also do not conduct for similar reasons. The pulse of current which is pulled from the base of the transistor Q6 turns the transistor Q6 on. The transistor Q6 turning on forward biases the base to emitter junction of the transistor Q7, turning the transistor Q7 on. A regenerative action occurs between the transistors Q6 and Q7, the collector of each transistor providing base current for the other transistor. The two transistors turn themselves on in a regenerative action. The collector of the transistor Q6 is approximately at the voltage level VS as is the emitter of the transistor Q7. The sustained output (1S) is derived from the collector of the transistor Q6. This output feeds the staircase generator. The voltage at the junction of resistors R21 and R22 rises to approximately 14 volts. The voltage at the junction of resistors R26 and R28 is approximately 6 to 7 volts. Thus, the base to emitter junction of a transistor Q8 is forward biased and a positive going signal is obtained from the collector of the transistor Q8. This positive going signal (1D) represents a decimal output and it is this signal which is fed to the indication device 42 (FIG. 1). In the meantime, the voltage at the emitter of the transistor Q5 remains at approximately 14 volts. The voltage on the base of the transistor Q5 is approximately 20 volts and the base to emitter junction of the transistor Q5 is reverse biased through the resistor R19 thus turning the transisor Q5 off. An output obtained from the collector of the transistor Q5 then returns to zero volts through a resistor R20. Thus a decimal output is obtained only from the lead 1D. This first input trigger pulse turns on only the first stage transistors Q6 and Q7. However, when the transistors Q6 and Q7 are on, the voltage at the emitter of the transistor Q7 is about 20 volts. This causes the voltage at the junction of the resistor R24 and the capacitor C3 to go to 20 volts to condition the diode CR5 to accept the second input trigger pulse which causes the diode CR5 to conduct pulling current out of the base of the transistor Q9 through the resistor R25 and capacitor C3. This turns on second stage transistors Q9 and Q10 in the same manner as the conduction of the diode CR4 causes first stage transistors Q6 and Q7 to turn on. Once a stage is on it stays on to maintain the sustained outputs. Similarly, the third input trigger pulse turns on the third stage transistors Q12 and Q13 by causing the diode CR6 to conduct, etc.

Thus, it can be seen that the transistors Q5, Q8, Q11 and Q14 along the bottom of FIG. 6 form an AND gate which decodes the condition of the counter to provide a single decimal output to drive the readout unit. An output is obtained when the emitter is positive with respect to the base. This condition is obtained when the stage to which the emitter is connected is on and the stage to which the base is connected is off. In the above example, the emitter of the transistor Q8 is connected to the on stage (transistors Q6 and Q7) and the base of the transistor Q8 is connected to the off stage (transistors Q9 and Q10). Accordingly, output 1D is obtained from the transistor Q8. When the stages on each side of the decoding transistor are both off, the emitter voltage will be at approximately 4 volts while the base voltage will be held at approximately 7 volts by virtue of the divider formed by the resistors R26, R31 and R30, for instance. The emitter to base junction under these conditions is reverse biased and the decoding transistor is off. When the stages on each side of the transistor are on, the emitter voltage will be at approximately 14 volts by virtue of the divider formed by resistors R22 and R21, for instance. The base voltage will be approximately 20 volts, since the base is returned to the emitter of the transistor Q10, for instance, through the resistor R28, for instance. Thus the emitter to base junction is again reverse biased and the transistor is turned off providing no output.

Initially with the collector of the transistor Q4 at the supply voltage potential, the voltage at the junction of a resistor R13 and the resistor R14 is approximately 14 volts. This is also the voltage at the emitter of the transistor Q5. Resistors R17, R22 and R21 form a divider which sets a potential of approximately 7 volts at the emitter of the transistor Q7. The base of the transistor Q5 is returned to this 7 volts through the resistor R19. Thus, the base to emitter junction of the transistor Q5 is forward biased and the transistor Q5 is turned on and an output is obtained from the collector of the transistor Q5. This output is obtained on lead 0D. By virtue of the same voltage divider composed of the resistors R17, R22 and R21, the voltage on the emitter of the transistor Q8 is at approximately 4 volts. The voltage as the emitter of the transistor Q10 is approximately 7 volts by virtue of the divider composed of the resistors R26, R31 and R30. The base of the transistor Q8 is returned to 7 volts at the emitter of the transistor Q10 through the resistor R28. Thus the transistor Q8 is turned off and no output exists on the lead 1D. Similar voltage levels exist for the transistors Q11, Q14, etc. Thus, a non-sustained output is obtained only on line 0D. Referring again to the transistor Q5, the register R19 limits the current which the base of the transistor Q5 can draw from the junction of the resistors R17 and R22. The resistor R20 returns the output to ground when the transistor Q5 is off. The resistor R15 serves to isolate the anode of the diode CR4 from the collector of the transistor Q4. In a similar fashion, a resistor R24 serves to isolate the anode of the diode CR5 and in turn the trigger line from the transistor Q7 which is turned on and in a low impedance condition. A resistor R25 limits the current which can be drawn from the base of the transistor Q9 by the trigger pulse. A resistor R27 which is the equivalent of the resistor R18 reverse biases the base to emitter junction of the transistor Q9 in its reset state thus turning the transistor Q9 off. There is no collector current flowing in the transistor Q9 and thus the voltage drop across a resistor R32 is zero. Since the emitter of the transistor Q10 is held at a positive voltage by virtue of the resistive divider R26, R30 and R31, the transistor Q10 also is reverse biased and both transistors Q9 and Q10 are therefore off in the reset condition. The resistor R32 returns the sustained outputs, in this case 2S, to ground when the stage consisting of the transistors Q9 and Q10 is off. In the first stage, the junction of the resistors R14 and R15 is connected to the collector of the transistor Q4. The collector of the transistor Q4 is at approximately the same potential as would be the emitter of a previous stage corresponding to the transistor Q7, for instance, if this stage were present. Thus this looks like an on stage and the transistor Q5 and the resistor R15 see the equivalent of an on stage when looking toward the front end of the counter. At the end of the counter, a resistor R40 corresponds to the resistor R26 of stage two, a resistor R41 corresponds to the resistors R30 and R31 of stage two, the resistor R42 corresponds to the resistor R28 of stage two, and the transistor Q15 corresponds to the transistor Q8 of stage two. Otherwise, the stages are repeated and the function of each stage is identical to the one before it.

One of the two identical staircase generators 27 and 28 is shown in detail in FIG. 7. Negative staircase generator 27 uses the lead 53 as its output lead to the summing junction 26 and positive staircase generator 28 uses the lead 54 as its output lead to the summing junction 26. The mechanical switch 29 which is shown in FIG. 1 for the sake of simplicity is in actual practice two solid state gates (one for each staircase generator). The solid state gate shown in FIG. 7 is numbered 29a. The gate for the negative staircase generator 27 is controlled by the NAND gate 127 (FIG. 3) as hereinbefore described and the gate for the positive staircase generator 28 is controlled by the NAND gate 128 (FIG. 3) as hereinbefore described.

The staircase generators meet a number of requirements. In counting from the most significant decade, a false step (programmer inputs 3D, 4D and 5D—FIG. 7) equal to the value of one digit from each decade, except the units decade, is required. This false step must be easily substracted in order to proceed on to the next significant decade. To facilitate subtracting the false steps, each resistor in a given decade is of equal value. This also permits each of the staircase generator gates to operate under the same conditions for a given decade. That is, the on voltage requirements and the off leakage current requirements are identical for each gate or switch in a given decade. In order to obtain equal steps out of the staircase generator using the equal value resistors, a constant voltage source is applied to the resistors which are in parallel across such source.

The constant voltage source is obtained from a voltage regulator 169 which derives its reference from resistors 170 and 171 across an example 15 volt supply. Voltage from the junction of the resistors 170 and 171 is fed to the reference input of an operational amplifier 172. The output of the amplifier 172 is connected to the base of an output transistor 173 to drive it. A feedback voltage is obtained from the emitter of the transistor 173 which is applied to the inverted input of the amplifier 172. This is a typical connection of a voltage regulator and provides good voltage regulation at the point at which the feedback voltage is obtained. The voltage at the junction of resistors 174 and 175 is the same as the voltage at the junction of the resistors 170 and 171 (typically 6 volts when using a 15 volt supply). The staircase generating resistors (eleven resistors 176 in the thousands decade, ten resistors 177 in the hundreds decade, ten resistors 178 in the tens decade, and nine resistors 179 in the units decade) are connected across the regulated voltage supply. One end of each of the resistors 176 and 177 is tied to the plus side of the regulated voltage and the other end is tied to a common line 185 through a transistor switch 180. One end of each of the resistors 178 and 179 is tied to a tap (hereinafter described) on the regulated voltage and the other end is tied to the common line 185 through a transistor switch 180. The emitters of the switches 180 are connected to the resistors 176–179 and their bases are connected to resistors 181 which function to limit current.

Each of the transistor switches 180 is controlled from one of the sustained output leads from the ring counters 38–41 or from the programmer outputs 3D, 4D and 5D which are connected to the respective ressitors 181. These sustained output leads are identified as COUNTER 38 leads 1S–10S, COUNTER 39 leads 1S–9S, COUNTER 40 leads 1S–9S, and COUNTER 41 leads 1S–9S and the programmer leads are identified as 3D, 4D, and 5D. As the count proceeds in the counters which energize the transistor switches 180, an output voltage is obtained from the generator. The output voltage is in the form of a staircase because as each transistor switch is turned on an additional increment of voltage is generated across the output resistors. The voltage steps obtained by putting the 11 resistors 176 into the circuit add steps in the thousands place. Resistors 177 have values ten times as great as the resistors 176. Therefore, the voltage steps (hundreds decade) generated when the resistors 177 are put into the circuit are only one tenth as large as the thousands decade. Resistors 176 and 177 are across the regulated 6 volt output from the regulator 169. A tap at ten percent of the regulated voltage is provided for the tens and units decades, the tap being obtained at the junction of the resistor 175 and a resistor 182. The resistors 175 and 182 have values such that the voltage at their junction is 0.6 volts and the values of the resistors 178 (tens decade) and the resistors 179 (units decade) are chosen to produce voltage steps in the case of the resistors 178 one tenth as large as the hundreds decade and in the case of the resistors 179 one tenth as large as the tens decade.

Plus and minus outputs (leads 54 and 53, respectively) are obtained by using the output either from the collector or from the emitter of the output transistor 173. The gate 29a includes two transistors 183 and 184. If the input to the transistor 183 (from gate 127 or 128) is minus it is off allowing the transistor 184 to turn on. This causes the input voltages from the counters 38–41 and the programmer 37 to be clamped to a negative 10 volts supply through diodes 186 and the transistor 184. This maintains the transistor switches 180 off, thus preventing a staircase voltage from being generated from that particular staircase generator (two generators). By allowing the input to the transistor 183 (from gate 127 or 128) to become positive, it is turned on turning off the transistor 184. This removes the diode clamps from the inputs and a staircase voltage is generated. A resistor 188 limits current into the base of the transistor 183, a resistor 189 functions as a load resistor for the transistor 183 and, when the transistor 183 is off, supplies current into the base of the transistor 184, and a resistor 190 provides a base return to the minus 10 volt supply for the transistor 183.

Equal increments of current are generated in each decade by closing a switch to each equal value resistor in succession. These equal increments of current flow through the emitter resistor 174 and a collector resitsor 187 of the output transistor 173. The voltages across these resistors change due to the increments of current through the resistors. Therefore, a staircase voltage is generated at the outputs 54 and 53 which are taken from the collector and emitter, respectively, of the output transistor 173.

Figure 8:
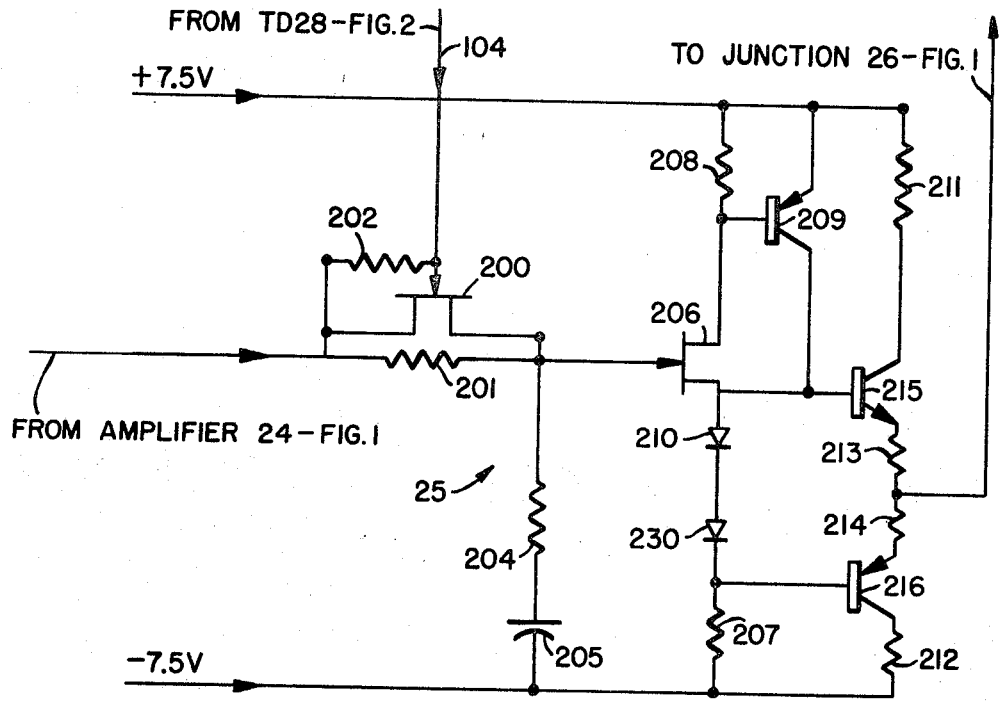
FIG. 8 is a schematic diagram of the variable bandwidth circuit shown in FIG. 1.

The variable bandwidth filter circuit 25 is shown in detail in FIG. 8. In its normal condition, the circuit exhibits a high bandwidth. The circuit is gated by a logic signal on the lead 104 during the readout cycle to provide a relatively low bandwidth. This reduction in bandwidth effectively lowers the noise at the output of the circuit. The major components of this noise are generated at the input of the amplifier 24.

A transistor 200, connected to receive the logic signal on the lead 104, is a field effect transistor which is used as a solid state switch. The transistor 200 is normally on or in a low resistance condition. The transistor 200 in the on condition effectively bypasses a relatively high resistance 201, connected to receive the signal from the amplifier 24, which is in parallel with it. A second field effect transistor 206 is used as a source follower to provide a high impedance load on the transistor switch 200, the resistor 201, a resistor 204 and a capacitor 205. The capacitor 205 functions as a low pass filter. The resistor 204 limits the current through the transistor switch 200. When the transistor switch 200 is on or in the low resistance state, the filter is effectively bypassed or shorted out and can be ignored. When the transistor switch 200 is in the off or high resistance state, the filter (capacitor to 205 and resistor 204) shunts the resistor 201 and serves to reduce the bandwidth of the circuit. This bandwidth reduction is typically on the order of a factor of one thousand. The theoretical noise level, therefore, is reduced by a factor of approximately thirty. A resistor 202 serves to return the gate of the transistor switch 200 to the source potential in the absence of a signal on the lead 104 which is derived from the logic circuit. The resistance of the transistor switch 200 changes in a linear fashion from a value on the order of several hundred ohms to a value of several tens of megohms. The signal from the logic circuit arriving on the lead 104 is made to traverse through this linear region relatively slowly in order that the resistance of the transistor switch 200 increases over a period of time. This allows an envelope type reduction of the noise arriving from the amplifier 24. If an abrupt transition from a low resistance to a high resistance state of the transistor switch 200 were made, it is conceivable that the noise may be at a maximum level. Therefore, the voltage at the junction of the resistors 201 and 204 would decay to the average level of the voltage from the amplifier 24 with a time constant determined by the resistor 201 and the capacitor 205. This obviously would require a relatively long time. The envelope reduction is a reduction to the average value of the voltage received from the amplifier 24. The source follower transistor 206 has a feedback stage composed of a resistor 208 and a transistor 209 around it. This feedback stage serves to maintain a constant current through the source follower as well as lowering the output impedance of the source follower. The source follower drives a push-pull output stage composed of two transistors 215 and 216. A voltage is developed across two diodes 210 and 230 which is comparable to the threshold voltage associated with the base to emitter junctions of the transistors 215 and 216. This allows these transistors to be slightly forward biased preventing a small dead zone near zero signal level. A resistor 207 is the load resistor of the source follower. Resistors 211 and 212 serve to limit the current of the output transistors. Resistors 213 and 214 determine the quiescent operating current in the transistors 215 and 216.

Figure 9:
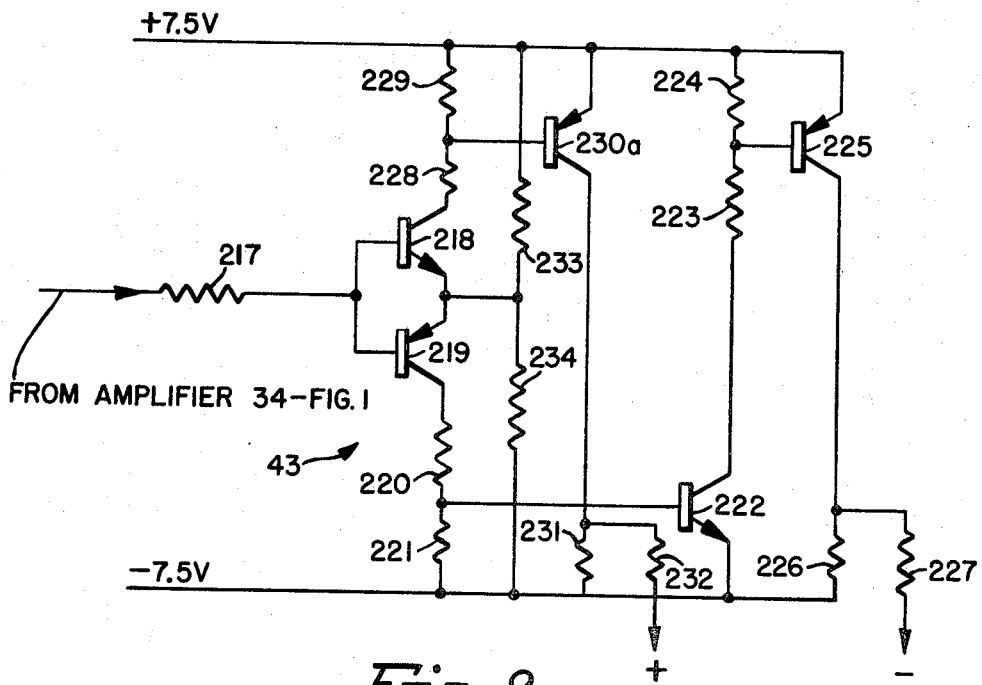
FIG. 9 is a schematic diagram of the comparator circuit shown in FIG. 1.

The comparator 43 is shown in detail in FIG. 9 and is driven from the amplifier 34 through a resistor 217 which serves to limit the load on the amplifier 34 as well as limiting the input current into two transistors 218 and 219. The transistors 218 and 219 are common emitter stages which have their emitters tied to the junction of two resistors 233 and 234. These resistors are normally of equal value. Therefore, the emitters of the two transistors 218 and 219 are tied to a potential representing the center of the power supplies. The base to emitter threshold voltages of the transistors 218 and 219 must be overcome before an output signal can be obtained from this circuit. When an input signal is less than the threshold voltage of either of these transistors, no output is obtained. The absence of an output is interpreted in the logic circuitry to be an O.K. signal. Thus, the amplitude of the O.K. signal is determined by the threshold of the two transistors.

Let us assume a positive signal is obtained from the amplifier 34. This positive signal turns on the transistor 218. The transistor 219 in turn will be turned off. The transistor 218 draws current from the base of a transistor 230a through a resistor 228 which limits the amount of current which can be drawn. A resistor 229 serves as a base leakage resistor for the transistor 230a. The flow of current from the base of the transistor 230a turns on the transistor 230a. This develops a voltage across a resistor 231. This voltage is then transferred to the logic circuitry through a resistor 232 and represents a positive signal. The transistor 219 being turned off results in two transistors 222 and 225 also being turned off.

Next, assume a negative signal of sufficient amplitude to exceed the threshold voltage of the transistor 219. This turns on the transistor 219 allowing current to flow through a resistor 220 into the base of the transistor 222. A resistor 221 is a base leakage resistance for the transistor 222. This results in the transistor 222 turning on. The transistor 222 in the on condition draws current from the base of the transistor 225 through a resistor 223. This turns on the transistor 225. The transistor 225 turning on develops a voltage across a resistor 226. This voltage is transferred to the logic circuit through a resistor 227 and represents a negative signal. A resistor 224 is a base leakage resistance for the transistor 225.

The tare circuit 52 (FIG. 1) is shown in detail in FIG. 10. The thousands decade uses the resistors 176 (FIG. 7) in the staircase generator by turning on the transistor switches 180 (FIG. 7) which are associated with these resistors. Leads 1S–10S (FIG. 7) of the counter 38 are shown as a single cable in FIG. 1 connected to both of the staircase generators 27–28. However, the leads 1S–10S first go through the tare device 52 as shown in FIG.

1 and in detail in FIG. 10. The sustained outputs from the thousands counter 38 arrive on input leads 1S–10S as inputs to the tare circuit (FIG. 10) and leave on output leads 1S–10S from the tare circuit as inputs to the staircase generators (see leads 1S–10S in FIG. 7). The counter signals are transferred through the tare circuit from the 2S–10S inputs leads to the 2S–10S output leads through diodes 300–308, respectively, except in the case of the 1S leads which are connected directly together. A positive going voltage on output leads 1S–10S turns on the associated transistor switches 180 to produce the staircase voltage as hereinbefore described. When a net-gross switch 363 having ganged decks 364–366 is in its "GROSS" position, the tare circuit is inoperative and the staircase generators 27–28 and the rest of the converter operate as described above.

When the net-gross switch 363 is in its "NET" position, a positive voltage also can be applied selectively to output leads 2S–10S by operating a switch 367 having a deck 368 ganged to move as one therewith, switches 367 and 368 being operated by means of a knob 168 (FIG. 1) connected thereto. The positive voltage originates at a +10 volt source applied to a lead 340 which is connected to the deck 364 of the net-gross switch 363. The switch 367 is connected to the "NET" terminal of the switch deck 364 and is movable to apply the positive voltage to any one of the terminals 401–409. When switch 367 is at terminal 401, the switch 368 is at terminal 411, when switch 367 is at terminal 402, the switch 368 is at terminal 412, etc., the switch 368 being movable from terminal 411 through terminals 412–418 to terminal 419. Terminals 401–409 are connected to the output leads 10S–2S, respectively, through diodes 310–318, respectively. Terminals 411–419 are connected to the input leads 10S–2S, respectively. The leads connecting the terminals 401–409 to the diodes 310–318, respectively, are joined through diodes 319–326, respectively.

Placing the switch 367 on the terminal 401, for example, puts the positive voltage on the output lead 10S through the diode 310. Placing the switch 367 on the terminal 403, for example, puts the positive voltage on the output lead 8S through the diode 312, and also puts the positive voltage on the output lead 9S through the diodes 320 and 311, and also puts the positive voltage on the output lead 10S through the diodes 320, 319 and 310. Thus, as the switch 367 is advanced from terminal 401 to terminal 409, leads 10S–2S become energized with sustained outputs turning on the associated transistor switches 180 in the staircase generators.

To summarize the operation of the thousands decade of the staircase generator (FIG. 7), when the net-gross switch 363 is in its "GROSS" position, the counter 38 input leads 1S–10S control the staircase generator to add from 1000 to 10,000 units worth of counterbalancing voltage to the summing junction 26 as described above. When the net-gross switch 363 is in its "NET" position, the counter 38 input leads 1S–10S control the staircase generator for the purpose of indicating net weight to the extent that the tare circuit output leads 1S–10S are not energized through the tare switch 367 to add from 1000 to 10,000 units worth of counterbalancing voltage to the summing junction 26 for the purpose of indicating tare weight. The tare circuit is an option. The system operates under the same principle with or without the tare circuit. When the tare circuit is used, the counterbalancing voltage increments in the thousands place simply are labeled differently, i.e., tare and net weight. The total capacity of the weighing scale is 10,999 pounds. If the tare circuit is used to control four 1000 staircase steps, the tare capacity is 4,999 pounds leaving 6000 pounds as the maximum net weight capacity. Using the resistors 176 in the staircase generators for gross or net and tare weighing saves the expense of providing additional resistors and a precision adjustment. Also, the most significant decade can never go out of calibration.

Figure 3:
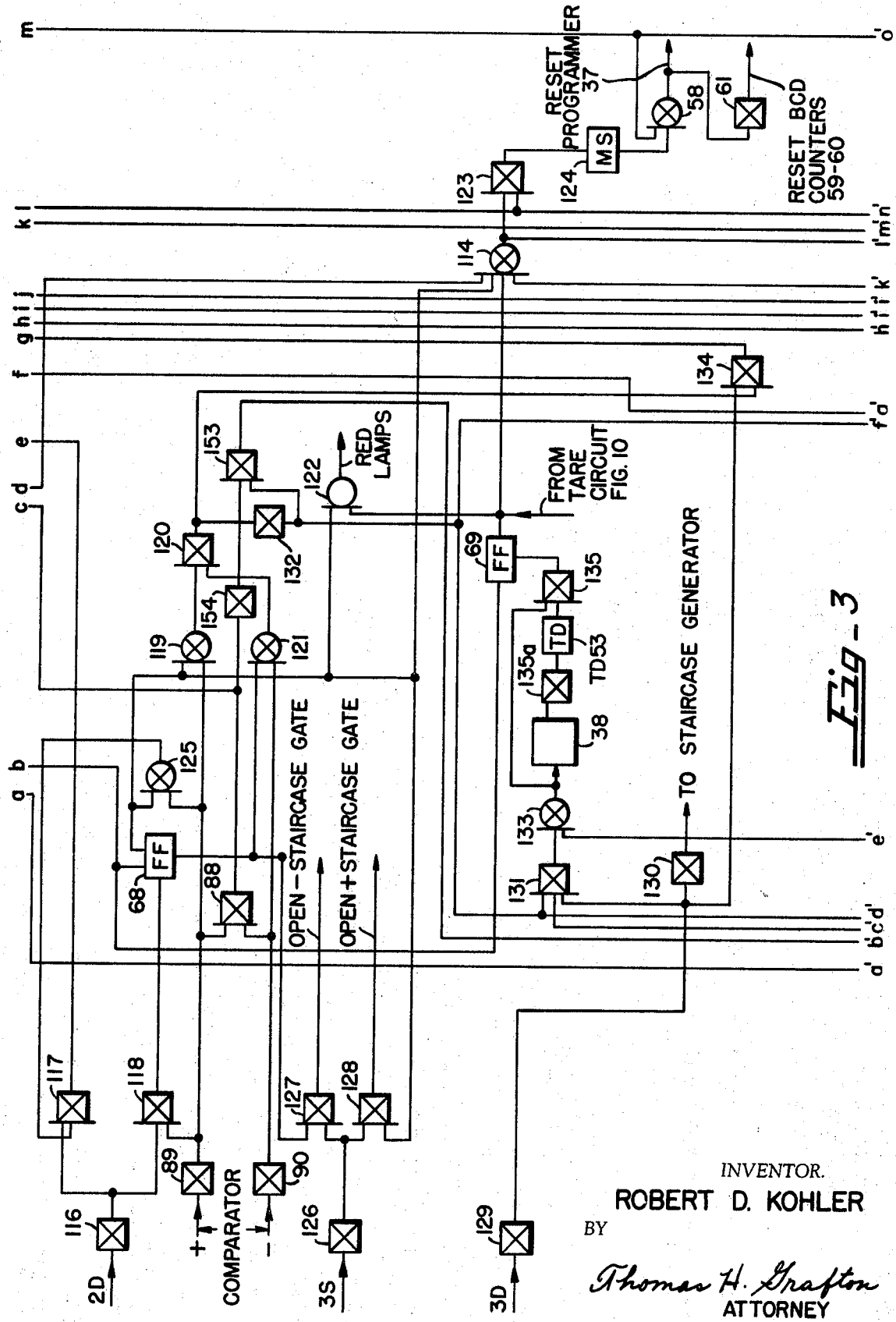
Figure 4:
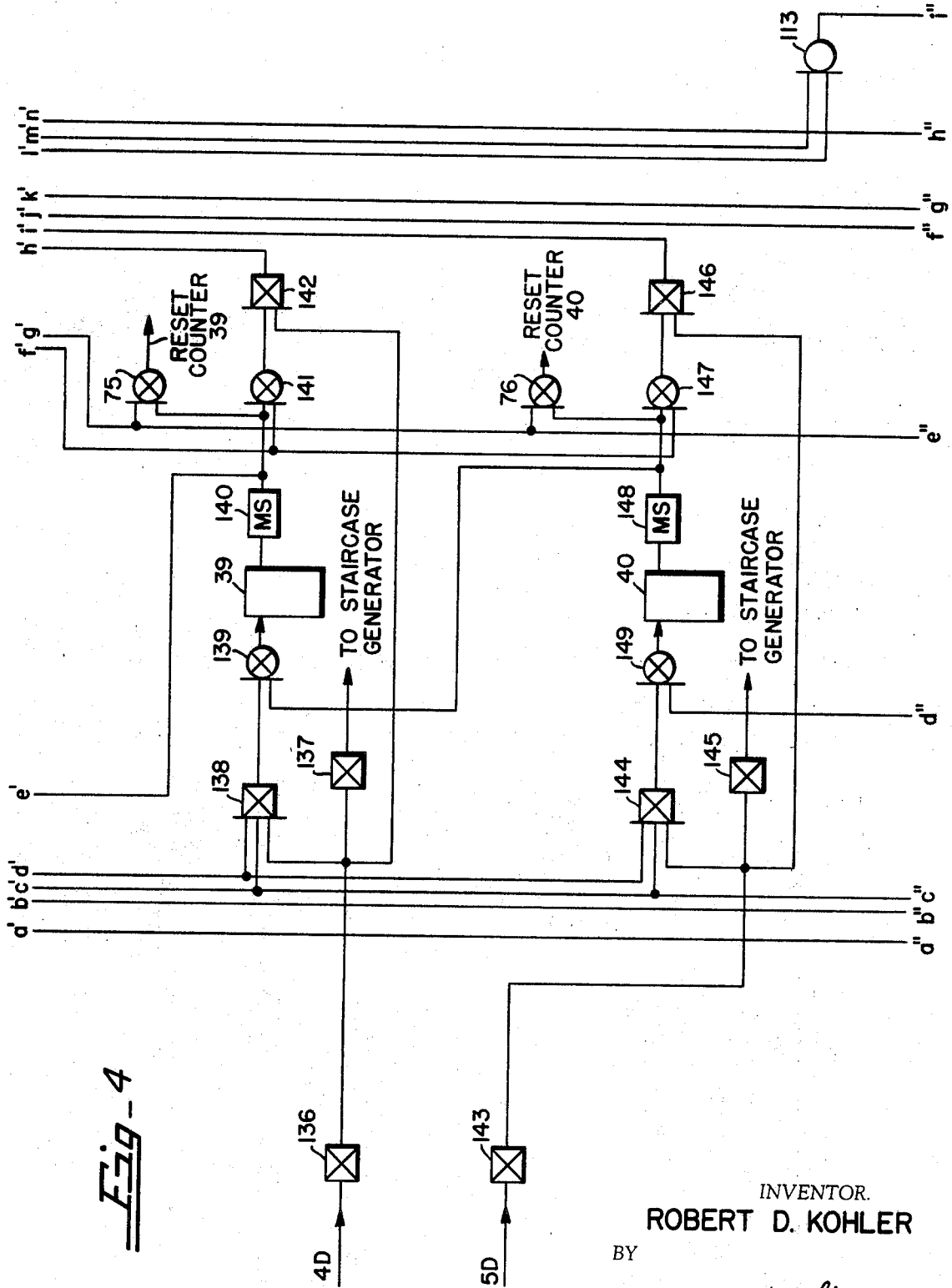
Figure 5:
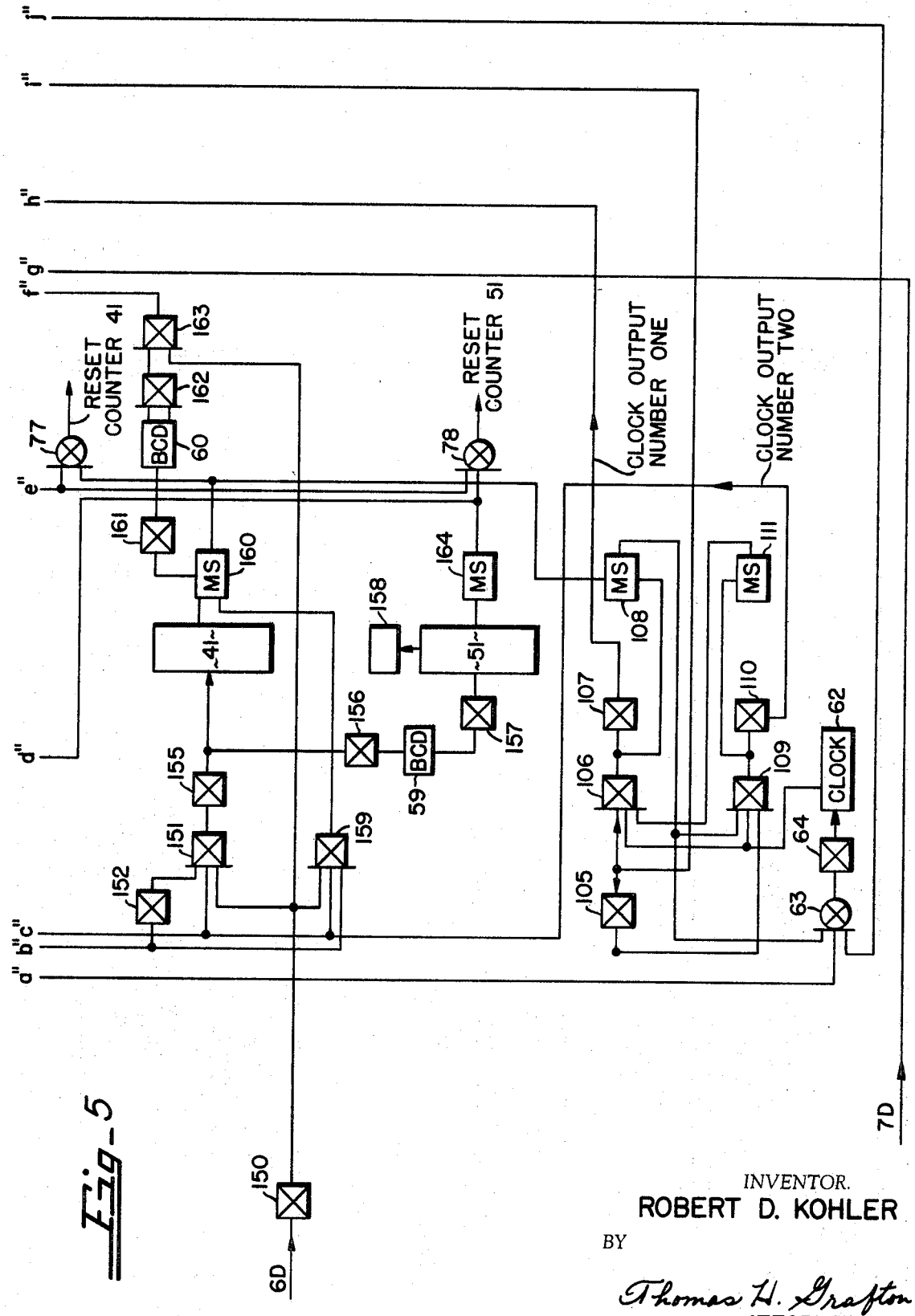

As the tare switch 367 is advanced, output leads 10S, 9S, 8S, etc. become energized turning on the associated transistor switches 180 in the staircase generators. This means that these switches cannot be used for active weighing, i.e., they cannot be used twice. An interlock circuit is provided to guard against attempts to use such transistor switches 180 twice. This interlock circuit includes the switch 368 which moves as one with the tare switch 367. For example, with a tare weight of 3000 pounds selected by the tare switch 367 on its terminal 403 (output leads 8S–10S energized, the net weight capacity in the thousands place is reduced to 7,000 pounds. In our example, with tare switch 367 on its terminal 403, the interlock switch 368 is on its terminal 413. Should an attempt be made to weigh a load having a net weight with an eight or more in the thousands place, the counter 38 input lead 8S is energized. This signal is applied through the terminal 413, the interlock switch 368, and the deck 365 of the switch 363 out of a lead 361 to the over circuit hereinbefore described and shown in FIG. 3. The lead 361 (FIG. 10) is connected as indicated in FIG. 3 to the OR gate 122 which turns on the red lamps. In other words, the total capacity in the thousands place is 10,000 pounds and if any of this capacity is used for tare weighing only the remainder is available for net weighing, and any attempt to use more than such remainder causes the red lamps to light.

The tare circuit 52 also makes use of the staircase generators to supply tare voltage increments in the hundreds, tens and units places, with a total tare capacity in such places of 999 pounds. However, in the case of these places, additional resistors are connected across the regulated voltage supply, i.e., the staircase resistors 177–179 are not used for tare weighing. This is accomplished by extending leads 185, 341 and 342 of the staircase generator (FIG. 7) as similarly numbered leads 185, 341 and 342 into the tare circuit (FIG. 10) and placing such additional resistors across the regulated voltage supply of the staircase generator. The additional resistors are numbered 328–330; resistors 328 (FIG. 10) being equal in value to resistors 177 (FIG. 7), resistors 329 (FIG. 10) being equal in value to resistors 178 (FIG. 7), and resistors 330 (FIG. 10) being equal in value to resistors 179 (FIG. 7). Resistors 177 and 328 are connected to the lead 341 and resistors 178–179 and 329–330 are connected to the lead 342. Resistors 328–330 are connected to the lead 185 (−7.5 volts supply from staircase generator) through consecutive shorting switches 369–371, respectively, operated by means of the knobs 327 (FIG. 1) and through a transistor 331. As switches 369–371 are advanced from positions "1" through positions "4," for example, positions "1–4" are closed, because the switches are consecutive shorting switches. Thus, four of the resistors 328, four of the resistors 329 and four of the resistors 330, in our example, would be connected through the switches 369–371 and the transistor 331 to the lead 185. Connecting the resistors 328–330 to the lead 185 has the same effect as connecting the resistors 177–179 (FIG. 7) to the lead 185, i.e., increments of staircase voltage are produced. Resistors 177–179 are connected across the regulated voltage supply under the control of the counter 39–41 outputs 1S–9S (net or gross weight depending on the position of the net-gross switch 363) and resistors 328–330 are connected across the regulated voltage supply under the control of selectively operable switches 369–371 (tare weight). The total weighing scale capacity is 10,999 pounds without tare. If a load weighing 10,999 pounds is placed upon the scale and 999 pounds are tared off by turning the knobs 327 (FIG. 1) to 999, the gross weight is arrived at by adding 999 indicated by calibrations on the knobs 327 and 10,000 indicated by the indicators 42 (FIG. 1). If a load requiring more than ten counts into the counter 38 is placed upon the scale, the over capacity interlock circuit operates to light the red lamps as described above.

Referring to FIG. 1, the switch 29 is used to keep the staircase voltages off the summing junction 26 until the readout cycle is in progress. Since the tare voltages are similar in function to the gross or net voltages, it is necessary to provide a similar switching function in the tare circuit (FIG. 10). The switching function for the 1000 place tare voltages is provided automatically by the gate 29a (FIG. 7) because the resistors 176 (FIG. 7) have the double function (net and tare) described above. The transistor 331 (FIG. 10) provides the similar switching function for the units, tens and hundreds tare decades. The transistor 331 ties the commons of the tare switches 369–371 to the lead 185 (−7.5 volts supply) only during the readout cycle which takes place during positions three through seven of the programmer 37. When programmer signal 3S (sustained) arrives on a lead 332, it passes through the switch deck 366 in its "NET" position to turn on a transistor 334 through a resistor 333 connected to the base of the transistor 334 (transistor 334 on only during the readout cycle). When not in the readout cycle or when the switch deck 366 is in its "GROSS" position, a −10 volts supply connected through a resistor 335 to the base of the transistor 334 holds this transistor off. When the transistor 334 is on, a transistor 336 is off by virtue of a diode 337 which connects the collector of the transistor 334 to the base of the transistor 336. Turning the transistor 336 off allows the transistor 331 to be turned on by means of base current drawn through a resistor 338 connected to the +10 volts supply (lead 340). If the transistor 334 is off due to lack of the programmer signal 3S or the net-gross switch being in the "GROSS" position, the transistor 336 will be on due to base current flow through a resistor 339 connected to the +10 volts supply (lead 340) and the transistor 336 diverts the current flow from the resistor 338 to the −7.5 volts line 185 which is connected to the emitter of the transistor 336. Therefore the transistor 331 is off and the resistors 328–330 are out of the circuit.

It is to be understood that the above description is illustrative of this invention and that various modifications thereof can be utilized without departing from its spirit and scope.

Having described the invention, I claim:

1. A system for measuring an analog signal comprising, in combination, an analog signal source having an output consisting of a direct current analog signal and an unwanted direct current signal, a power supply for energizing the source, switch means for connecting the power supply to the source, means for canceling said unwanted signal establishing a zero reference, and means responsive to the switch means for measuring the difference between the zero reference and the analog signal.

2. A system according to claim 1 wherein an input amplifier is in circuit with the signal source and variable bandwidth means is provided for lowering the bandwidth of the amplifier automatically during measurement of said difference.

3. A system for converting an analog signal into a representation comprising, in combination, an analog signal input source, a summing junction connected to the output of the input source receiving first direct current analog and first other direct current signals from the input source, means for applying second direct current analog and second other direct current signals equal in amplitude and opposite in phase to said first signals to the summing junction whereby said first signals are canceled, means for removing the first analog signal from the summing junction whereby the second analog signal remains in the summing junction, and means for converting the second analog signal to said representation.

4. A system according to claim 3 wherein the means for applying the second signals to the summing junction includes an amplifier which in a first mode of operation, while the first analog signal is applied to the summing junction, is an integrating amplifier and which in a second mode of operation, while the first analog signal is removed from the summing junction, is a hold amplifier.

5. A system according to claim 4 having means for varying the bandwidth of the amplifier and thus for varying the bandwidth of said system.

6. A system according to claim 3 wherein the means for converting the second analog signal converts the signal to a digital representation and includes staircase generator means for generating increments of reference voltage representative of the digits in the places in the digital representation and means for comparing the increments of reference voltage corresponding to the most significant place with the second analog signal first until said most significant place is found and thereafter for comparing increments of reference voltage corresponding to the lesser significant places with the second analog signal in steps toward the least significant place until the entire digital representation is found.

7. A system for converting an analog signal into a representation comprising, in combination, an analog signal source having an output consisting of a direct current analog signal and an unwanted direct current signal, summing junction means for receiving said signals, a power supply for energizing the source, switch means for connecting the power supply to the source, means for applying signals equal in amplitude and opposite in phase to said unwanted signals to the summing junction when the switch means is operated to disconnect the power supply from the source whereby the unwanted signals are canceled, and means for converting the analog signal, when the switch means is operated to connect the power supply to the source, to said representation.

8. A system according to claim 7 wherein the means for applying signals equal in amplitude and opposite in phase to said unwanted signals to the summing junction includes an amplifier which in a first mode of operation is an integrating amplifier and in a second mode of operation is a hold amplifier.

9. A system according to claim 8 having means for varying the bandwidth of the amplifier.

10. A system according to claim 7 wherein the means for converting the analog signal converts the signal to a digital representation and includes means for generating increments of reference voltage representative of the digits in the places in the digital representation and means for comparing the increments of reference voltage corresponding to the most significant place with the second analog signal first until said most significant place is found and thereafter for comparing increments of reference voltage corresponding to the lesser significant places with the second analog signal in steps toward the least significant place until the entire digital representation is found.

11. A system according to claim 7 wherein the means for converting the second analog signal converts the signal to a digital representation and includes means for generating a group of reference voltages for each place in the digital representation, the reference voltages in each group being equal to each other.

12. A system for converting an analog signal into a digital representation comprising, in combination, an analog signal source, means for generating increments of reference voltage representative of the digits in the places in the digital representation, means for comparing the increments of reference voltage with an analog signal from the source in steps until the digital representation is found, and means for indicating the reference voltage increments as said digital representation, said means for generating including a staircase generator comprising a constant voltage source, a plurality of resistors in parallel across the source for generating increments of current, and means for translating said increments of current into a staircase voltage.

13. A system for measuring an analog signal comprising, in combination, an analog input signal source, variable filter means connected to the source for varying the bandwidth of the system, means for converting the signal to a representation during a time interval, timer means for varying the time interval, there being optimum values for said time interval and said bandwidth requiring the time interval to be lengthened when the bandwidth is narrowed and the time interval to be shortened when the bandwidth is widened, and adjustment means connecting the filter means and the timer means for conjoint movement, whereby movement of the adjustment means to select the optimum bandwidth maintains the optimum time interval or movement of the adjustment means to select the optimum time interval maintains the optimum bandwidth.

14. A system for converting an analog signal into a representation comprising, in combination, an analog input source, means for generating a reference voltage, means for comparing a signal from the source with the reference voltage and detecting a null condition, timing means, adjustment means for selecting a bandwidth for the system which rejects vibration effects and for setting the timing means, bypass means for bypassing the adjustment means to set the bandwidth of the system to a value greater than that set by the adjustment means to obtain fast system response, logic means responsive to said null condition for operating the bypass means permitting the bandwidth to be determined by the adjustment means and for starting the timing means, and means responsive to the timing means timing out and to a null condition for indicating said reference voltage as said representation.

15. An electronic weighing system comprising, in combination, a voltage source for establishing a first voltage functionally related to the weight of an article to be weighed, staircase generating means for generating increments of reference voltage, means for comparing the first voltage with the reference voltage, a tare circuit connected to the staircase generating means for so controlling the staircase generating means that at least some of said increments of reference voltage are used for tare weighing and the rest are used for net weighing, and means for indicating said reference voltage in terms of weight.

16. An electronic weighing system according to claim 15 wherein the tare circuit includes interlock means for signaling when an attempt is made to use one of the reference voltages already in use for tare weighing for net weighing to indicate over capacity loads upon the weighing system.

17. An electronic weighing system according to claim 15 wherein the staircase generating means includes a constant voltage source, a plurality of resistors in parallel across the source for generating increments of current, and means for translating said increments of current into said increments of reference voltage, and wherein the tare circuit includes means for selecting at least some of said resistors for tare weighing, whereby the rest of said resistors are used for net weighing.

18. An electronic weighing system according to claim 17 wherein the tare circuit includes additional resistors selectively connectible in parallel across the source for generating increments of current for tare weighing.

References Cited

UNITED STATES PATENTS

| | | | |
|---|---|---|---|
| 3,063,635 | 11/1962 | Gordon | 235—151.33 |
| 3,124,794 | 3/1964 | Patmore | 340—347 |
| 3,263,186 | 7/1966 | Calcai | 235—183 |
| 3,295,368 | 1/1967 | Nevius | 177—211 |
| 3,316,547 | 4/1967 | Ammann | 340—347 |

MAYNARD R. WILBUR, Primary Examiner

J. GLASSMAN, Assistant Examiner

U.S. Cl. X.R.

177—211